(12) United States Patent
Lux

(10) Patent No.: US 8,215,913 B2
(45) Date of Patent: Jul. 10, 2012

(54) MODIFIED DARRIEUS VERTICAL AXIS TURBINE

(76) Inventor: Glenn Raymond Lux, Saskatoon, CA (US)

( * ) Notice: Subject to any disclaimer, the term of this patent is extended or adjusted under 35 U.S.C. 154(b) by 1120 days.

(21) Appl. No.: 12/103,875

(22) Filed: Apr. 16, 2008

(65) Prior Publication Data

US 2008/0267777 A1 Oct. 30, 2008

Related U.S. Application Data

(60) Provisional application No. 60/914,392, filed on Apr. 27, 2007.

(51) Int. Cl.
*F03D 1/02* (2006.01)
(52) U.S. Cl. ............... 416/195; 416/196 R; 416/198 R; 416/240
(58) Field of Classification Search ............. 415/4.2, 415/4.4; 416/195, 196 A, 198 R, 240, DIG. 9; 290/44, 55
See application file for complete search history.

(56) References Cited

U.S. PATENT DOCUMENTS

| | | | |
|---|---|---|---|
| 3,918,839 A | 11/1975 | Blackwell et al. | |
| 4,134,707 A | 1/1979 | Ewers | |
| 4,329,116 A | 5/1982 | Ljungstrom | |
| 4,449,053 A * | 5/1984 | Kutcher | 290/44 |
| 4,624,624 A | 11/1986 | Yum | |
| 5,183,386 A * | 2/1993 | Feldman et al. | 416/119 |
| 5,203,672 A * | 4/1993 | Wolf | 415/2.1 |
| 5,531,567 A | 7/1996 | Hulls | |
| 5,744,871 A | 4/1998 | Robles Akesolo | |
| 6,857,846 B2 | 2/2005 | Miller | |
| 6,979,170 B2 * | 12/2005 | Dery et al. | 415/4.2 |
| 7,156,609 B2 | 1/2007 | Palley | |
| 2005/0248160 A1 | 11/2005 | Watkins | |

FOREIGN PATENT DOCUMENTS

GB 2 000 556 1/1979

* cited by examiner

*Primary Examiner* — Ninh H Nguyen
(74) *Attorney, Agent, or Firm* — Ryan E. Dupuis; Kyle R. Satlerthwaite; Ade & Company Inc.

(57) ABSTRACT

A lift-type turbine comprising at least three blades at circumferentially spaced positions is supported for rotation about a vertical axis. Each blade has an airfoil shape to generate a torque about the axis responsive to wind across the blades. A support comprising cables under tension is connected between adjacent ones of the blades to extend generally circumferentially about the turbine. Accordingly a minimum number of parts form the structure of the blades while minimizing the drag produced during rotation thereof due to the support members lying in a common circumferential path. The tension of the support members can support the blades in a pre-stressed condition to optimize the shape and performance thereof.

20 Claims, 13 Drawing Sheets

MODIFIED DARRIEUS VERTICAL AXIS TURBINE

This application claims the benefit under 35 U.S.C. 119(e) of U.S. provisional application Ser. No. 60/914,392, filed Apr. 27, 2007.

FIELD OF THE INVENTION

The present invention relates to a modified darrieus or lift type turbine in which the blades have a general airfoil like shape and are supported for rotation about a vertical axis.

BACKGROUND

Modern wind turbines are either horizontal axis turbines or vertical axis turbines. Horizontal axis wind turbines dominate the market world wide. They normally have a nacelle, rotor and blades that sit on top of a tower. The nacelle consists of the generator, planetary gearing and all the control systems necessary to operate the turbine. The rotor holds the blades (usually 3) in their positions while they rotate around the main shaft in the nacelle. These wind turbines work for many years with little maintenance, however, they are very expensive. The economics of horizontal axis wind turbines have been improving, but still need subsidies in most parts of the world to be an economical energy alternative.

The vertical axis lift type wind turbines (excluding drag type turbines) such as the darrieus rotor, gyro rotors, or the H style turbines, have had moderate success. These turbines tend to have lower overall power efficiency and have little advantage over the dominant horizontal axis turbines. These turbines, however, do not need to be turned into the wind, they tend to be quieter and they have few moving parts.

Most turbines, whether horizontal or vertical axis, typically need towers to raise the turbines high above the ground surfaces where the wind velocity is much higher, and therefore, more beneficial. The towers are an expensive component and in most cases they limit the size of the turbine.

U.S. Pat. No. 4,134,707 belonging to Ewers and U.S. Pat. No. 6,857,846 belonging to Miller disclose examples of drag type turbines, rather than lift type turbines. The blades of the drag type turbines are arranged to rotate the turbines about a vertical axis by capturing wind energy on the faces of the blades to push the turbine in its rotation. In a drag type turbine, it is desired to maximize the overall size of the blades so that the blades span a maximum area within a given sweep area thereof. Use of various support arms and cables and the like to support the blades do not considerably affect the efficiency as the increased drag against rotation is partially offset by capturing more wind and due to the limited velocity of the turbine which is effectively limited to the speed of the wind. Each of the noted documents discloses multiple turbine sections stacked above one another, however in each instance a complex framework is required to support the large blades designed to capture as much wind as possible in a drag type turbine.

U.S. Pat. No. 7,156,609 belonging to Palley discloses one example of a vertical axis turbine formed of a plurality of individual blade sections which are assembled into a complex blade shape. The blades are supported at top and bottom ends by horizontal portions which provide drag against rotation without contributing to any beneficial lift forces to enhance rotation. Drag is typically of much greater concern in a lift type turbine as such turbines are most efficient when rotating at speeds which are plural times the speed of surrounding winds. Furthermore no additional structural support is provided to the blades along the length thereof which, in a lift type turbine, can be subjected to considerable centrifugal forces due to the high rotation speeds as well as strong lift forces towards the axis of rotation.

U.S. Pat. No. 5,183,386 belonging to Feldman discloses a vertical axis sail bladed wind turbine in which the blades comprise two fabric sail portions and a third cable portion arranged to be wound onto a drum in a collapsed position. The sail portion of the blades are not suitably arranged to resist strong lifting forces being generated or strong centrifugal forces from high rotation speeds and accordingly the turbine has limited application. In general the vertical portions of the sail blades would have to be quite short in order to overcome the centrifugal forces acting on them.

U.S. Pat. No. 4,624,624 belonging to Yum comprises a vertical axis turbine in which the blades are hinged for folding into a collapsed structure. Only a minimal portion of each blade is positioned at the outer periphery of the turbine where the turbine is operating at its greatest efficiency.

SUMMARY OF THE INVENTION

According to one aspect of the invention there is provided a lift-type turbine comprising:

at least three blades supported for rotation about a vertical axis of rotation of the turbine;

the blades being supported relative to one another at circumferentially spaced positions about the vertical axis of rotation;

each blade comprising a member having an airfoil shape in cross section such that the blades generate a torque in a direction of rotation of the turbine about the vertical axis responsive to a generally horizontal wind across the blades as the blades are rotated in the direction of rotation of the turbine; and a support connected between adjacent ones of the blades to extend generally circumferentially about the turbine.

The support preferably comprises a plurality of support members supported under tension between adjacent ones of the blades. Alternatively, the support may comprise an annular member providing additional support to the blades.

By providing a plurality of blades, for example three or more, and more preferably five, which are supported by additional support members spanning under tension between adjacent blades in a horizontal direction, a minimum number of parts is required to form the structure of the blades while minimizing the drag produced during rotation thereof. The support members being connected horizontally only between adjacent blades when there are three or more blades results in the support members lying generally in a common peripheral or circumferential path during rotation so as to have minimal effect on drag. The tension of the support members can support the blades in a pre-stressed condition to optimize the shape and performance thereof. Furthermore, when arranged in a circumferential path between adjacent ones of the blades and at various heights along the blades, the support members provide support against centrifugal forces on the blades during rotation.

The blades preferably comprise generally elongate and rigid members and the support members preferably comprise flexible cables supported under tension.

The support members are preferably between adjacent blades in at least one common plane lying perpendicularly to the vertical axis of rotation.

The blades may be supported in a flexed and pre-stressed condition by the support members.

The support members preferably span generally horizontally between the adjacent blades.

Each blade preferably comprises a plurality of blades segments which are connected end to end with one another and wherein the plurality of support members are connected to the blades at a junction between adjacent ones of the blade segments.

Preferably there is provided at least five blades evenly spaced circumferentially about the axis.

The turbine is preferably supported substantially wholly by the blades and the plurality of support members spanning under tension between the adjacent blades.

The plurality of blade segments of each blade preferably include: an upper blade segment radially outwardly at a downward incline from the top end of the turbine at the vertical axis, and a lower blade segment extending radially outwardly at an upward incline from the bottom end of the turbine at the vertical axis.

The blade segments of each blade may also include at least one middle blade segment extending substantially parallel to the vertical axis between the upper blade segment and the lower blade segment at a location spaced radially outwardly from the vertical axis.

The turbine may be provided in combination with at least one other turbine of like configuration in which the turbines are supported stacked above one another for rotation about a common vertical axis.

In some embodiments, at least one blade segment of each blade comprises a pivotal blade segment which is pivotal about a respective longitudinal axis relative to the other blade segments.

According to a second aspect of the present invention there is provided a lift-type turbine comprising:

at least three blades supported for rotation about a vertical axis of rotation of the turbine;

the blades being supported relative to one another at circumferentially spaced positions about the vertical axis of rotation;

each blade comprising a plurality of elongate blade segments;

each blade segment of each blade comprising a generally rigid member having an airfoil shape in cross section such that the blades generate a torque in a direction of rotation of the turbine about the vertical axis responsive to a generally horizontal wind across the blades as the blades are rotated in the direction of rotation of the turbine; and at least one of the blade segments of each blade comprising a pivotal blade segment which is pivotal about a respective longitudinal axis relative to the other blade segments.

By providing an additional blade segment within each blade which is pivotal about a longitudinal axis thereof, the performance characteristics of the turbine can be adjusted according to wind conditions. For example certain blade segments may be pivoted into a braking position in which interaction between the blade and the wind forces applies a braking torque to the turbine about the vertical axis. As wind conditions vary, it may be subsequently desired to pivot all blade segments into a position which applies a torque in a common direction of rotation responsive to wind forces.

Each pivotal blade section may be joined between a respective one of the upper blade segments and a respective one of the lower blade segments.

The longitudinal axis of each pivotal blade segment is preferably substantially parallel to the vertical axis of the turbine.

According to another aspect of the present invention there is provided a lift-type turbine comprising:

a plurality of blades supported for rotation about a vertical axis of rotation of the turbine;

the blades being supported relative to one another at circumferentially spaced positions about the vertical axis of rotation;

each blade comprising:
an upper blade segment extending radially outwardly at a downward incline from a top end of the turbine at the vertical axis;
a lower blade segment extending radially outwardly at an upward incline from a bottom end of the turbine at the vertical axis; and
at least one middle blade segment extending between the upper blade segment and the lower blade segment at a location spaced radially outwardly from the vertical axis;

each blade segment of each blade comprising a generally rigid member having an airfoil shape in cross section such that the blades generate a torque in a direction of rotation of the turbine about the vertical axis responsive to a generally horizontal wind across the blades as the blades are rotated in the direction of rotation of the turbine.

By forming the blades of a lift type turbine of segments in which the upper and lower segments form inclined lifting surfaces, a lower cost and simpler design of blade is produced while taking advantage of lift forces over the full length of the blade. Furthermore the portion of the blade at the outer periphery is increased to maximize the portion of the blade which is rotating at the periphery at optimum speed for maximizing efficiency.

In some embodiments, each blade segment is substantially straight in a longitudinal direction of the blade segment between opposing ends of the blade segment. The middle blade segments may also extend substantially parallel to the vertical axis at least half a height of the respective blade.

In some embodiments, the turbines can be stacked one above the other to take advantage of greater wind speeds spaced above the ground at higher altitudes without requiring a tower or complex support structure which does not contribute to producing any useful power. Stacked turbines in which lift type blades are used, are anchored through the use of bearings and tensioned cables secured directly to a shaft at the axis of rotation. The stacked turbines remain directly adjacent to one another contrary to drag turbine designs in which the maximized area of the blades interferes with connecting support cables. Complex support structures are required in prior art drag configurations of stacked turbines.

When the turbine is provided in combination with an auxiliary turbine of similar configuration, preferably:

the auxiliary turbine is stacked above the other turbine and arranged for rotation about a common vertical axis with the other turbine;

each blade of the other turbine comprises a plurality of blade segments including an upper blade segment extending radially outwardly at a downward incline from the top end of the turbine at the vertical axis and a lower blade segment extending generally radially outwardly from the bottom end of the turbine at the vertical axis;

each blade of the auxiliary turbine comprises a plurality of blade segments including an upper blade segment extending generally radially outwardly from the top end of the turbine at the vertical axis and a lower blade segment extending generally radially outwardly at a downward incline from the bottom end of the turbine at the vertical axis such that the upper blade segments of the other turbine and the lower blade segments of the auxiliary blade segments are substantially parallel; and there is provided an anchor member anchored at the common axis between the auxiliary turbine and the other turbine at one end and anchored to the ground at an opposing end.

In some embodiments a top end of each one of the blades is connected with a bottom one of at least one diametrically opposed one of the blades by an auxiliary support member spanning under tension therebetween.

In some embodiments there may also be provided an upper annular mount and a lower annular mount supported on the shaft, each annular mount being annular in shape and extending circumferentially about the vertical axis in a plane oriented perpendicularly to the vertical axis, the blades being mounted between the upper annular mount and the lower annular mount at a top end and a bottom end respectively at circumferentially spaced apart locations about the vertical axis.

According to a further aspect of the invention there is provided a lift-type turbine comprising:

a base annular frame member which is circular about a central upright axis thereof;

a plurality of blades mounted on the base annular frame member at circumferentially spaced locations about the base annular frame member;

a peripheral support system supporting the base annular frame member thereon for rotation about the central upright axis;

the blades being mounted on the base annular frame member for rotating movement therewith about the central upright axis;

the blades having an airfoil shape in cross section and being oriented to effect rotation of the support ring about the central upright axis responsive to a generally horizontal flow of air across the blades; and a generator driven by rotation of the base annular frame member and blades supported thereon about the central upright axis.

According to yet a further aspect of the present invention there is provided a lift-type turbine comprising:

a plurality of annular frame members which are supported concentrically about a central upright axis at axially spaced positions along the central upright axis relative to one another;

a plurality of blades spanning across the annular frame members at circumferentially spaced locations about the central upright axis;

the blades being mounted on the annular frame members for rotating movement together therewith about the central upright axis;

the blades having an airfoil shape in cross section and being oriented to drive rotation of the support ring about the central upright axis responsive to a generally horizontal flow of air across the blades; and a generator driven by rotation of the annular frame members and blades supported thereon about the central upright axis.

By providing an annular frame member supporting the blades thereon, the blades have sufficient structural support that no central axle is necessarily required. Furthermore the annular frame member may be supported directly on a peripheral support in the form of rollers at fixed positions about the circumference of the rotor of the turbine to greatly simplify the support structure required. The annular frame member also permits a generator to be coupled at a periphery of the rotor of the turbine to minimize the complexity of the gearing required. When multiple annular frame members are provided, the resulting structure of the rotor, including the blades and the frame members upon which they are supported, is well supported regardless of whether or not a peripheral support system or a peripheral generator are provided.

The peripheral support system may comprise a plurality of rollers rotatably supporting the base annular frame member thereon at circumferentially spaced locations about the base annular frame member, the rollers being generally fixed in position relative to the ground.

The generator may be coupled directly to the base annular frame member or may be coupled to the annular frame member through the peripheral support system.

There may be provided a plurality of auxiliary annular frame members mounted concentrically and axially spaced in relation to the base annular frame member. Preferably the auxiliary annular frame members are coupled between the blades to provide auxiliary support to the blades.

There may be provided a plurality of tension members, each spanning under tension diametrically across the turbine from an upper end supported on one of the annular frame members to a lower end supported on another one of the annular frame members.

There may be provided a brake for restricting rotation of the blades about the upright axis beyond an upper speed limit in which the brake is operatively connected to the base annular frame member.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1A:
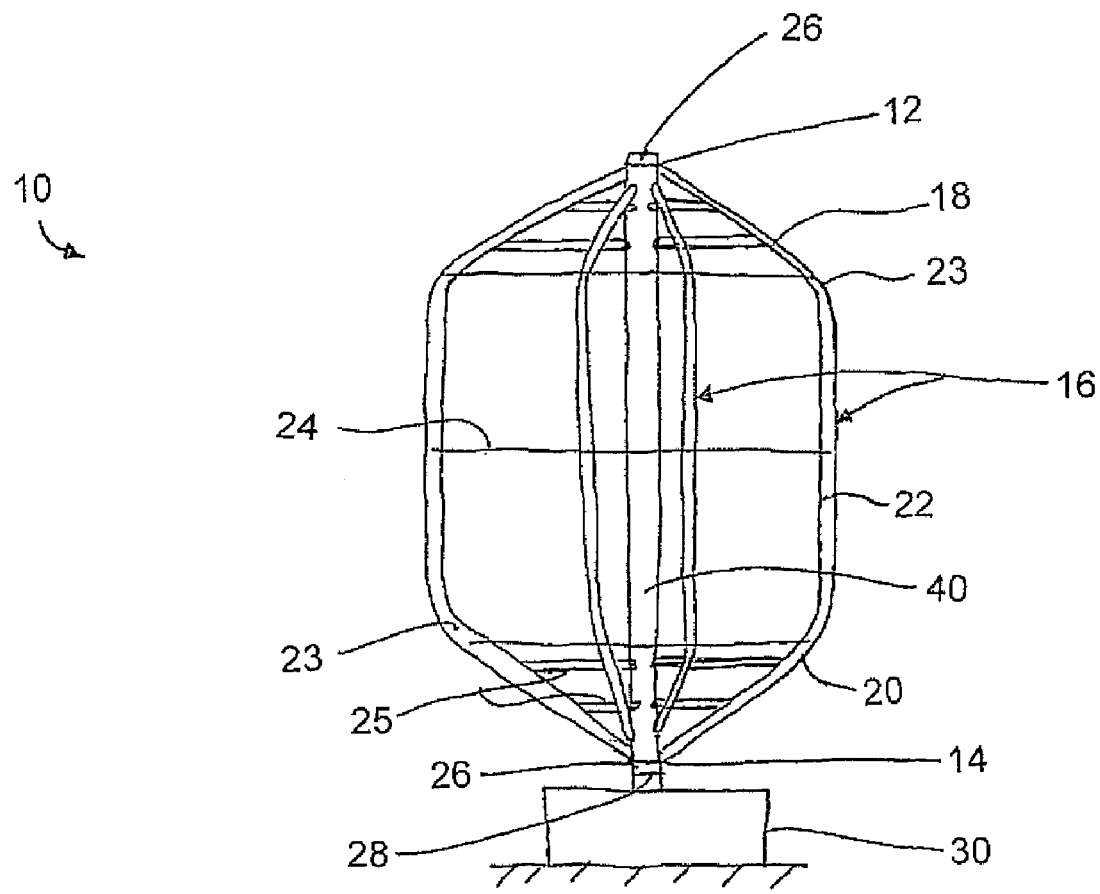
FIG. 1A is a side elevational view of a first embodiment of the turbine.

Referring to the accompanying figures there is illustrated a vertical axis lift type turbine generally indicated by reference numeral 10.

Although various embodiments of the turbine are described and illustrated herein, the common features of the first several embodiments will first be described herein.

The turbine 10 is supported for rotation about a vertical axis spanning between a top end 12 and a bottom end 14 of the turbine. The turbine includes a plurality of blades 16 spanning between the top and bottom ends of the turbine at evenly circumferentially spaced positions about the axis of rotation. The blades are all coupled to one another at the axis at both the top and bottom ends of the turbine. In the illustrated embodiments, a set of five blades are provided at an even spacing relative to one another.

Each blade 16 is formed of a plurality of blade segments which are assembled together at the time of manufacture. More particularly each blade includes a top segment 18, a bottom segment 20 and at least one middle segment 22. All of the blade segments comprise a generally straight member in a longitudinal direction between opposing ends thereof which is formed of substantially rigid material having an airfoil shaped cross section such that the blades generate a torque along the full length thereof between the top and bottom ends which is in a direction of rotation of the turbine about the vertical axis responsive to a generally horizontal wind across the blades as the blades are rotated in the direction of rotation about the axis thereof.

The top blade segment of each blade is joined with the other blades at the top end of the turbine at the axis of rotation to extend downwardly at a radially outward incline to an outer end of the top segment. Similarly the bottom blade segment 20 joins all of the other blades at the axis of rotation at the bottom of the turbine to extend upwardly therefrom at a radially outward incline to a respective outer end of the bottom segment. The middle segments 22 are arranged to join the top and bottom segments to form a continuous blade of blade segments connected end to end from the top to the bottom of the turbine which is formed of like material, typically having a substantially constant cross section.

A plurality of auxiliary support members 24 are provided in the form of flexible cables or other suitable members which can be supported under tension in connection between various points on the blades to support the structure of the blades of the turbine. Primary ones of the auxiliary support members span generally horizontally between each adjacent pair of blades at the junction between each adjacent pair of blade segments of the blades. When all of the support members 24 are connected between adjacent blades in a circumferential direction, each support member 24 forms a generally annular configuration about the periphery of the turbine so that as the turbine is rotated the support members remain in a generally common path to provide minimal drag to the rotating turbine. A bearing support 26 is provided at the top and bottom ends of the turbine to rotatably support the turbine. The bearings support 26 at the bottom of the turbine rotatably supports an axle 28 of the turbine which in turn is coupled to a generator 30 for generating useable power.

Figure 1B:
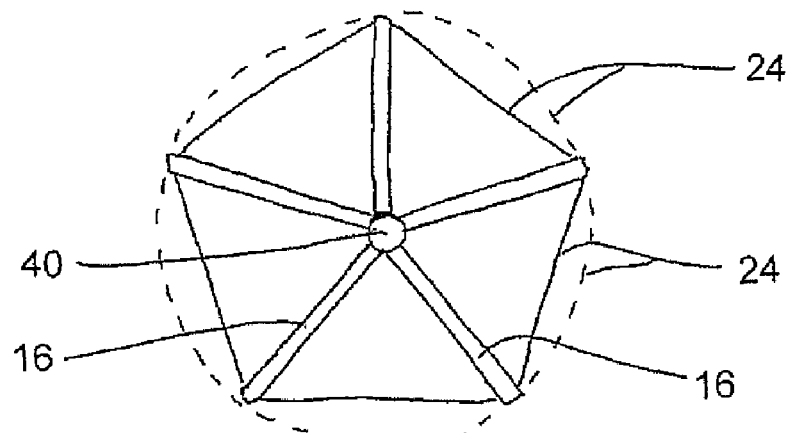
FIG. 1B is a top plan view of the turbine according to FIG. 1.

Turning now to the first embodiment as shown in FIGS. 1A and 1B, the turbine further includes a central column 40 joining the top ends of the blades to the bottom ends of the blades along the central vertical axis of rotation of the turbine. The column 40 is continuous with the axle 28 at the bottom which drives the generator. In this embodiment, the central column and the horizontally extending support members 24, comprising cables under tension, is all that is required to maintain the structural integrity of the turbine when rotating in use. The column 40 can be surrounded by a suitable column support or can provide sufficient structural support to the turbine alone through the bearings 26 that no additional guy wires and the like may be required.

In the first embodiment, there is provided a single middle segment 22 which is straight between the outer end of the top segment and the outer end of the bottom segment while extending parallel to the axis of rotation a height which is usually much greater than the length of either of the top or bottom blade segments so that the middle segment preferably extends more than half of the total height of the blades of the turbine. In the illustrated embodiment, the middle segments are approximately twice the length of either of the top segment of the bottom segment.

Also in the illustrated embodiment, the substantially straight segments are joined with one another by respective transition portions 23 which curved so that the blade segments of any blade are all smooth and continuous with one another from one segment to the next.

The blade segments may be all formed identical to one another so that the blades can be manufactured from interchangeable modular segments to minimize cost of manufacturing.

Also in the first embodiment, the support members 24 are arranged in a plurality of generally horizontal lying planes, oriented perpendicular to the vertical axis, such that each contains a circumferential path of support members at a different height in elevation between the top and bottom ends of the turbine relative to the other planes of support members 24. The different annular formations of support members are evenly spaced apart between the top and bottom ends of the turbine.

In the embodiment of FIG. 1A, a plurality of auxiliary support members 25 are coupled in a radial direction between the central shaft and the top and bottom blade segments respectively. The auxiliary support members are arranged in sets, in which all of the members within a given set are located in a common horizontal plane perpendicular to the vertical axis and communicate with a respective one of the blade. The auxiliary support members 25 are rigid to maintain orientation of the top and bottom blade segments relative to the shaft.

As shown in broken line in FIG. 1B, the length, tension and weight of the cable forming the support members 24 is arranged so that the support members 24 can bow or curve radially outward under centrifugal force when rotating about the turbine axis during operation of the turbine. When the length, tension and weight of the cable forming the support members 24 is optimally selected to both support the blades, while forming a circular path during rotation, the support members will typically have a tendency to bow downwardly slightly between adjacent ones of the blades under force of gravity when the turbine is static and not rotating. The outward curving support members 24 during operation cause the support members to align with one another along a common circular path so as to minimize drag against rotation and thus optimize efficiency of the turbine.

Figure 2:
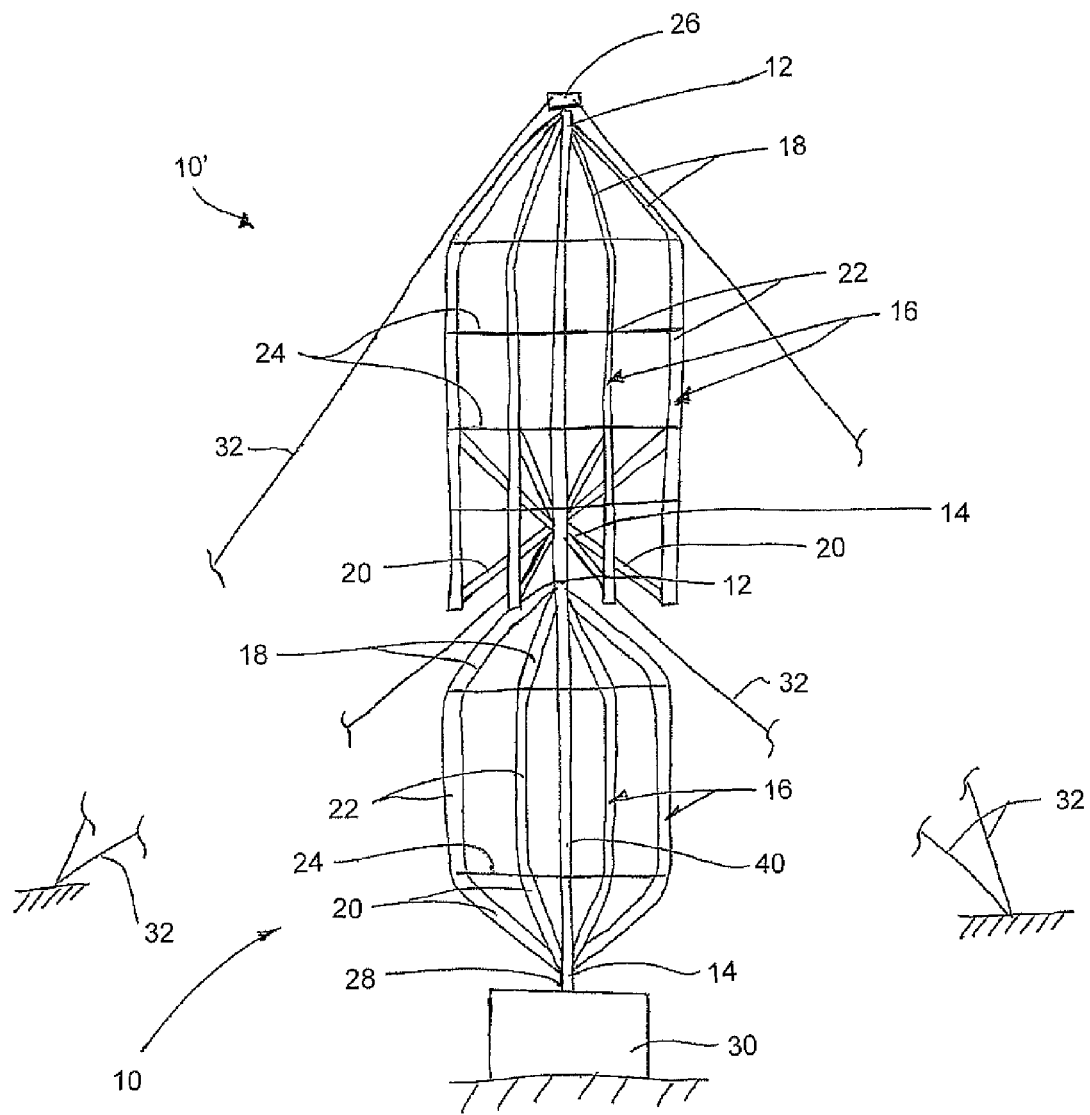
FIG. 2 is a side elevational view of the turbine according to FIG. 1 in a stacked configuration.

Turning now to FIG. 2, the turbine according to FIG. 1 is shown in a stacked configuration with an additional turbine 10' which is similar in configuration.

A plurality of anchor members 32 are provided in the form of guy cables extending from the upper one of the bearing supports 26 to the ground at a position spaced radially outwardly from the turbine when the bottom of the turbine is supported on the ground. Due to the inclined top blade segment 18 of the turbine, the cables forming the anchor members 32 can be anchored to the bearing support 26 at the axis of the turbine very close to the top end of the blades of the turbine by providing a slope on the cable which is near the slope of the top blade segments or which is shallower and more horizontal than the top blade segments.

The turbines are stacked one above the other along a common vertical shaft which defines the common axis of rotation of all the turbines when yet even further turbines are stacked. Many turbines may be stacked in series with one another in some embodiments. The turbines preferably drive a common generator located at the bottom on the ground with the turbines extending upwardly therefrom. In this instance bearing supports 26 are provided at the top and bottom ends of each turbine. Anchor members 32 extend from the shaft at the axis of rotation from the bearing supports directly to the ground in a direct path with the turbines remaining closely positioned adjacent one another due to the sloped top blade segments which permit the cables to be positioned near the blades when the slope of the cables defining the anchor members 32 closely matches the slope of the top blade segments.

The additional turbine 10', shown in FIG. 2 stacked above a first turbine 10, differs from the first turbine in that the bottom segment 22 of each blade extends downwardly and outwardly from an inner end at the vertical axis, to an outer end supporting the bottom end of the middle segment of the blade thereon. The bottom segments of the upper turbine 10' and top segments of both turbine are thus arranged to be substantially parallel to one another and to the anchor members 32 such that the upper turbine 10' and the lower turbine 10 can be located very closely to one another for maximizing the wind force to be captured by the turbines.

The initial cost per square meter of swept area, of a large turbine, may be considerably higher than the cost per square meter of swept area of several small turbines. If this is the case it may be beneficial to build several smaller turbines stacked above each other. The stacked turbines also take advantage of the stronger winds above the earth's surface.

Figure 3:
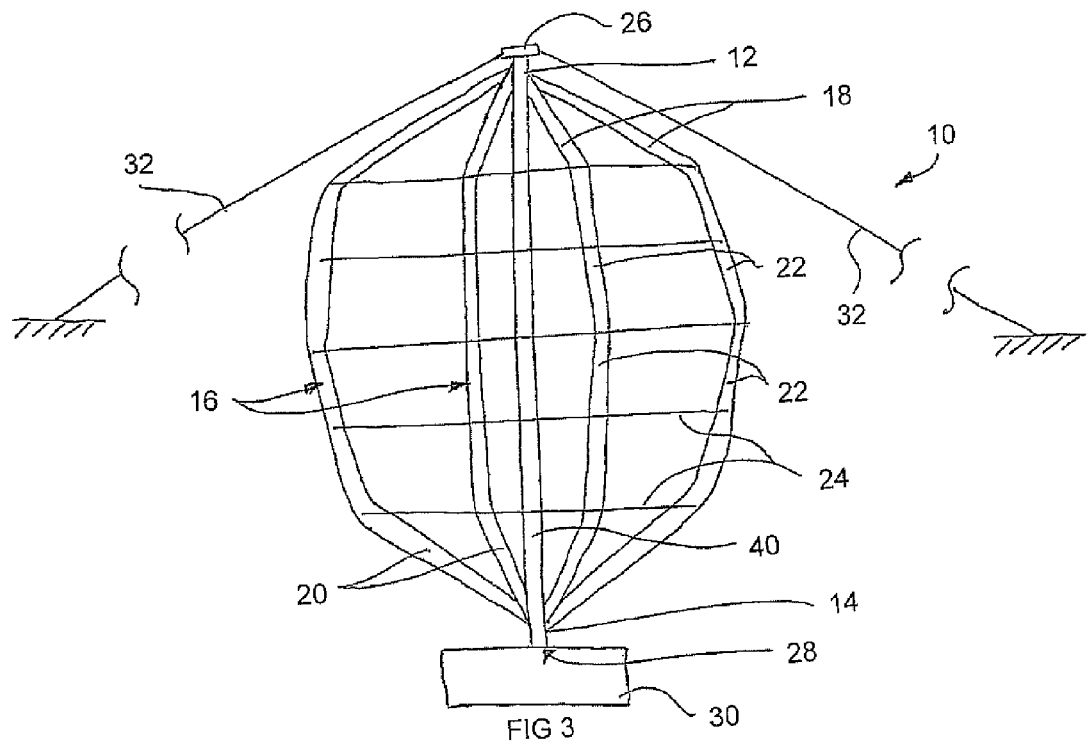
FIG. 3 is a side elevational view of a further embodiment of the turbine.

Turning now to the embodiment of FIG. 3, a turbine 10 is shown in which there is provided a pair of middle segments 22 which form an obtuse angle on the interior side thereof while similarly forming an obtuse angle with the respective adjacent top and bottom blade segments so that all of the adjacent blade segments meet at an obtuse interior angle on any given blade. In addition to the cables forming the auxiliary support members 24 spanning between the junctions of adjacent blades, the support members 24 may also be provided to span from a mid point along each blade segment, horizontally to a corresponding blade segment at a midpoint there along of an adjacent blade. The outwardly bent middle section defined by the two middle segments 22 of the blade provides some resistance to inward lifting forces directed at the axis of rotation to resists bending of the blades in use. The embodiment according to FIG. 3 may also be formed of modular segments during manufacture, and may also be used in a stacked configuration similarly to the other embodiments described herein. Guy cables 32 are again used to support the turbine at the top end thereof.

In further arrangements, turbine blades may be formed of segments similar to the segments of FIG. 3, but the segments are instead integrally joined with one another by curved intersection portions of the blades.

In a further embodiment, to also resist forces which act to bend the blades inwardly towards the axis of rotation, the blades may be configured to increase the mass thereof at the middle segments 22 or only at a central portion of the blades to increase the centrifugal forces acting on the blade and offset inward lifting forces.

Figure 4:
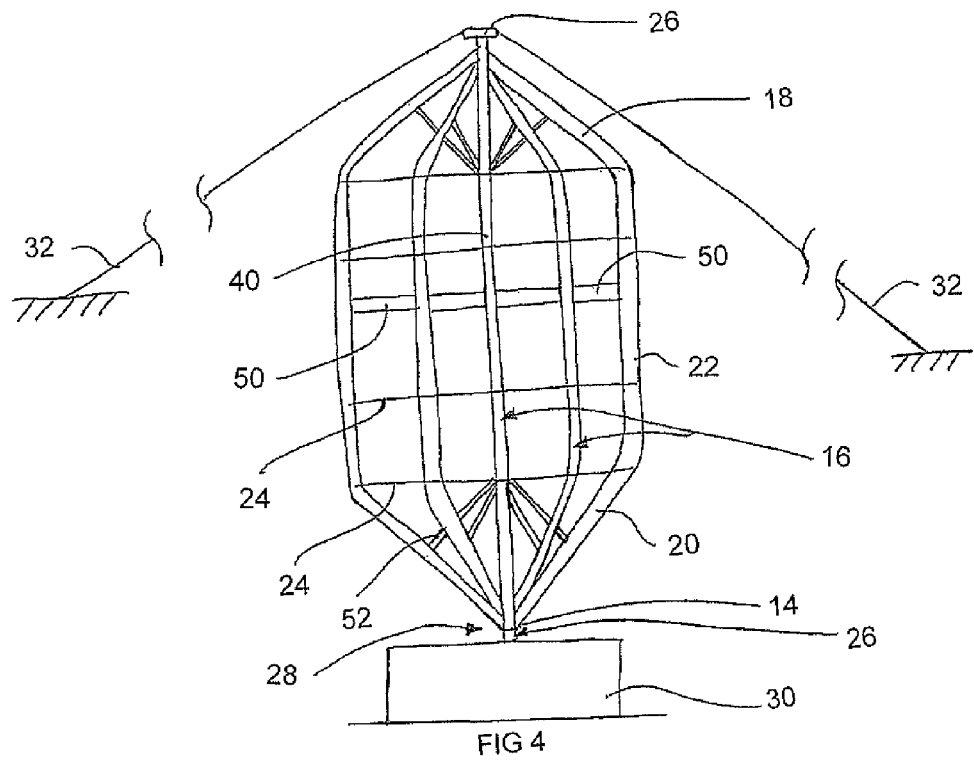
FIG. 4 is a side elevational view of another embodiment of the turbine.

Turning now to FIG. 4, a further embodiment is illustrated in which the turbine generally resembles the configuration of FIG. 1, however with the addition of auxiliary braces 50 having an airfoil cross section which span radially from the shaft to a midpoint along the blades to provide auxiliary support to the blades. In addition to or instead of, auxiliary supports 52 may also be provided which are coupled between the central column and the top and bottom blade segments. A plurality of additional auxiliary supports 52 may also be added at other locations on the turbine where support is needed. It is understood that many variations of supports 52 and cables are possible other than the configurations of the illustrated embodiment while still falling within the scope of the present invention.

Figure 5A:
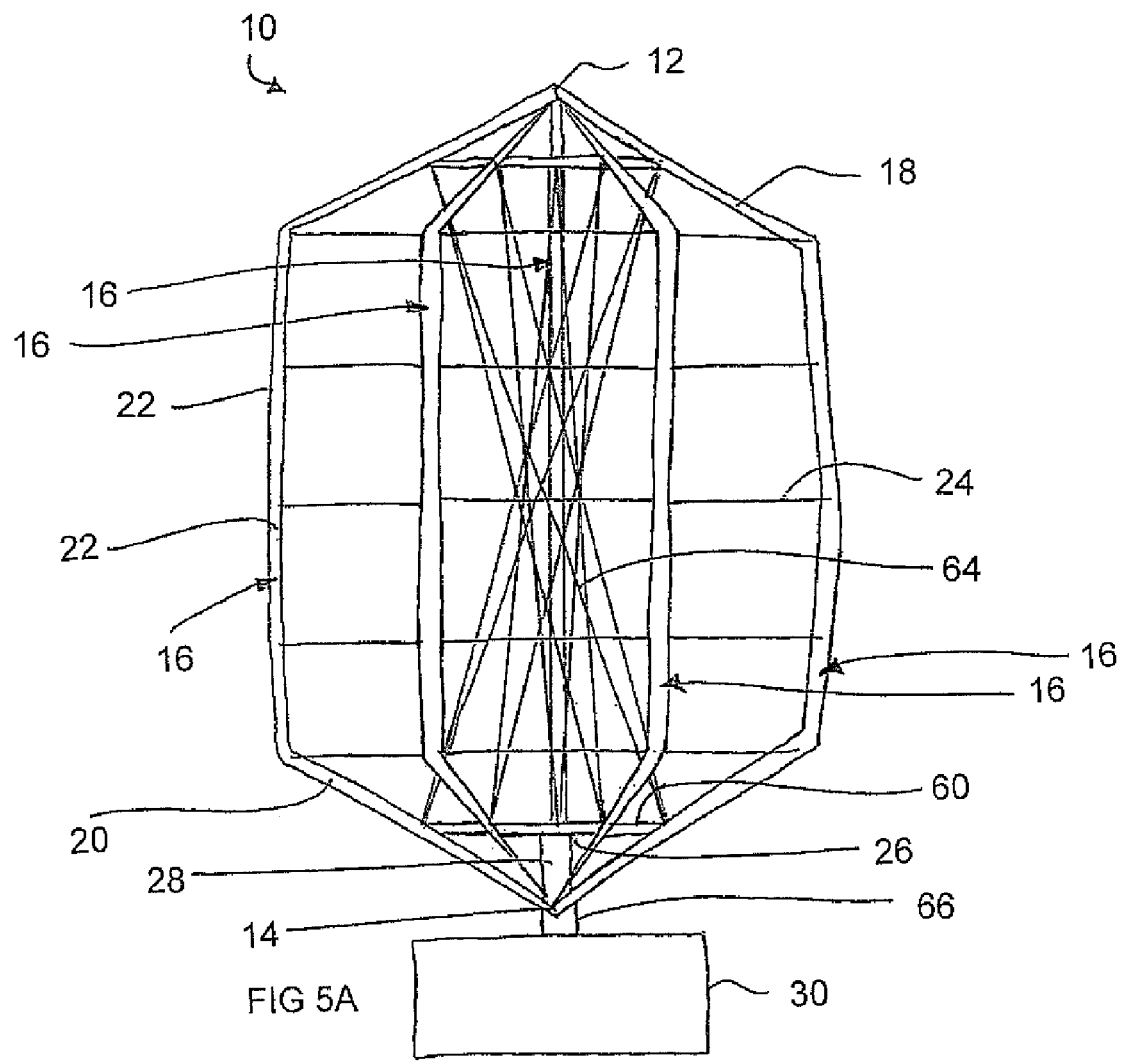
FIG. 5A is a side elevational view of yet a further embodiment of the turbine.
Figure 5B:
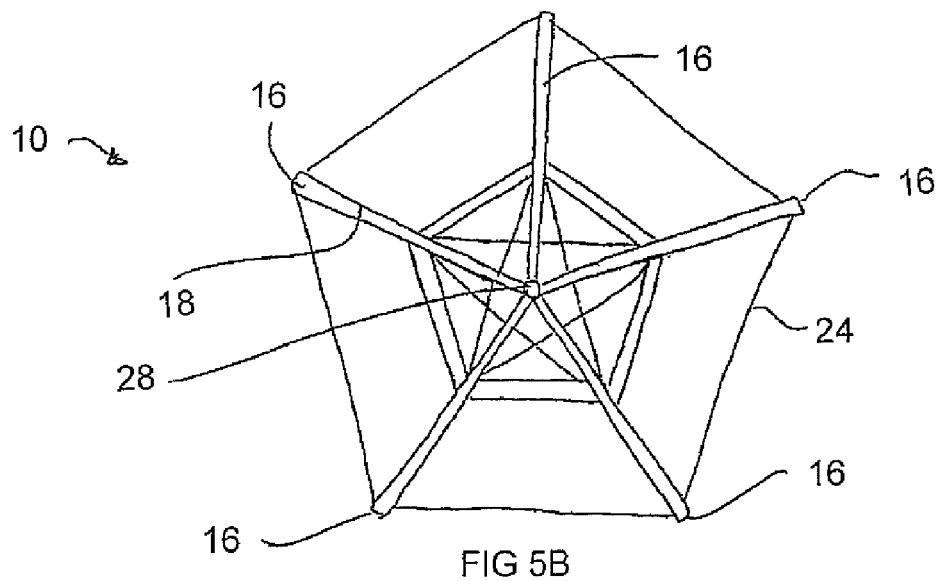
FIG. 5B a top plan view of the turbine according to FIG. 5A.

Turning now to the embodiment of FIG. 5, the turbine 10 is shown without a central column extending along the length of the turbine and without guy wires, but rather the turbine structure consists solely of the blades spanning between the top and bottom ends of the turbine at the outer periphery thereof so that the blades comprise rigid self supporting blade segments supported only by flexible auxiliary support members 24 in the form of cables under tension between adjacent blades as in the previous embodiment, but as well as between the top and bottom segments at top and bottom ends of the turbine in the form of supports 64. Also additional supports 60 are arranged to span between a location on each top segment (for example a midpoint) and a similar location (for example a midpoint) on one or two additional top segments which are diametrically across the turbine so that when five blades are provided, the supports 60 form a pentagram configuration. Yet further supports 64 under tension may be provided which span from each top segment to at least one diametrically opposed bottom segment 20 to provide further support to maintain the blades in their proper orientation. Rigid supports of airfoil cross section may also be connected horizontally between adjacent blades for additional support when no central column is provided. Two middle sections 22 are preferred on each blade in this embodiment with the blades forming an obtuse interior angle similarly to the embodiment of FIG. 3. In addition to two middle sections, or in place thereof, there may also be provided an outwardly curved blade section. The bottom ends of the blades are suitably braced to a bottom shaft 66 which couples the turbine to the generator to drive the generator.

The turbines described herein generally comprise lift type turbines in which the blade speed is at least two times faster than the speed of the wind. Although the addition of cables to a lift turbine does provide drag, this drag is minimal when using many blades because the angle between the cables and the relative wind direction is less significant with more blades.

The turbines described herein have advantages in that the five blades provide the turbine rotor with stability as vibrations and torque ripples are minimal and are easily compensated. Use of cables under tension provides additional stability as well as offering very little drag to the system. The resulting construction is easy to manufacture at a reasonable cost. By stacking the turbines, advantage can be taken of higher winds above the surface of the ground.

An advantage of the substantially vertical blades is that all points along the blades move at the same speed, as opposed to the curved blades of a darrieus rotor, where each point has a different velocity and therefore, a different angle of attack. The most efficient angle of attack is applied along the full length of the blade instead of just a few points.

Changing the attached angle of the segments can be very important. The attached angle, or the angle between the chord line and the radius, can be changed easily with vertical blades. This angle when adjusted only a few degrees, can improve the turbine efficiency. Also, a pivot can be provided at the ends of each vertical middle blade segment to effectively change the attached angle. When this attached angle is changed significantly, the blade provides more drag then lift causing the rotational speed to decrease. The decrease in speed functions as a safety item that protects the turbine and the surrounds when the turbine would otherwise over speed.

Sectioned or segmented blades on a turbine could be at various angles. These angles could change from horizontal to vertical, however the most efficient turbine would have long vertical or near vertical blades at the middle sections. On large turbines the lift force on the blades may be larger than the opposing centrifugal forces. Providing an outward bend in the middle sections of the blades can counter these forces. As well, increasing the mass at this location increases the centrifugal forces. When providing very long vertical sections, additional support can be provided at various points along the length thereof, generally in the shape of airfoils to reduce aerodynamic drag. The additional supports 50 can be attached between the blades and the center column.

Turning now more particularly to the embodiment of FIG. 6, the turbine 10 again comprises a plurality of blades 16 circumferentially spaced about a central column 40 for rotating an axle 28 of a generator 30. As noted above, each blade includes a top segment 18, a bottom segment 20 and a middle segment 22 connected therebetween. Support members 24 in the form of cables under tension are connected between adjacent blades 16 in a horizontal plane lying perpendicular to the vertical axis and at plural intermediate positions along the height of the turbine. More particularly the support members 24 are connected to each blade at an intersection between the middle segment and one of the top or bottom segments to define two common planes within which the support members lie in a generally circumferential or peripheral path about the turbine. By shortening the support members to apply a tension thereto, the outer ends of the top and bottom segments can be pulled radially inwardly in a pre-stressed condition which causes the normally straight middle section to bow outwardly in a flexed and prestressed condition. The outward bow of the middle section provides strength to resist inward forces from lift acting on the blades during rotation.

Figure 6:
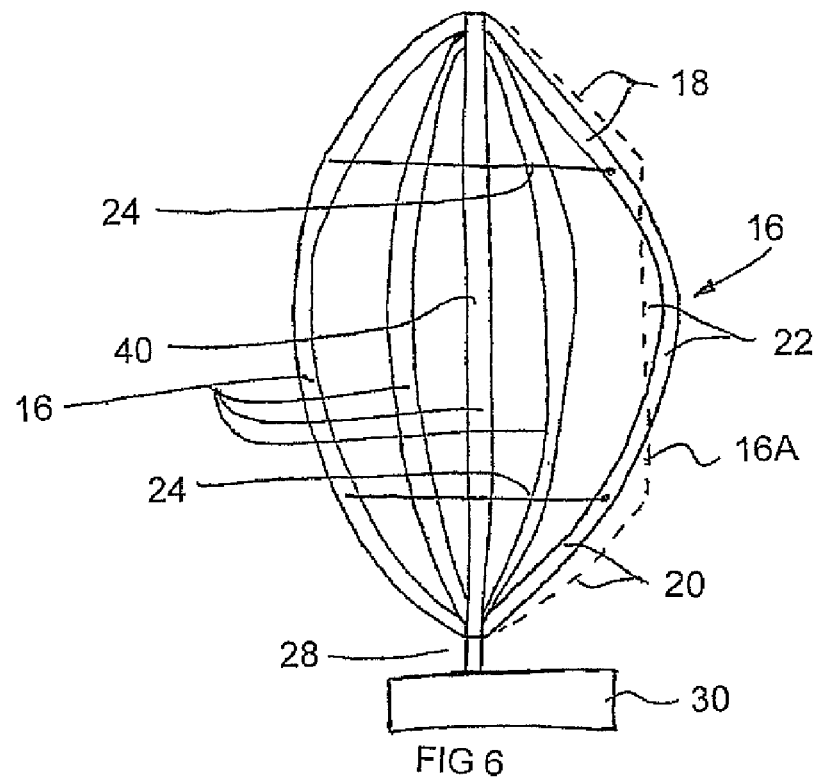
FIG. 6 is a side elevational view of a further embodiment of the turbine in which the blades are supported in a pre-stressed condition.

As shown in FIG. 6 the pre-stressed and outwardly bowed middle section are shown in solid line as compared to the original unstressed condition of one of the blades shown in broken line by reference character 16A which would otherwise appear similar in construction to the embodiment of FIG. 1 or 4. This configuration optimizes the shape of the blades while forming the blades of modular straight sections or segments which can be easily manufactured and assembled. The pre-stressed condition also applies some resistance to bending of the blades in use during rotation thereof to increase the strength and stability of the blade while minimizing the weight and structural materials required to support the blades of the turbine.

Figure 7:
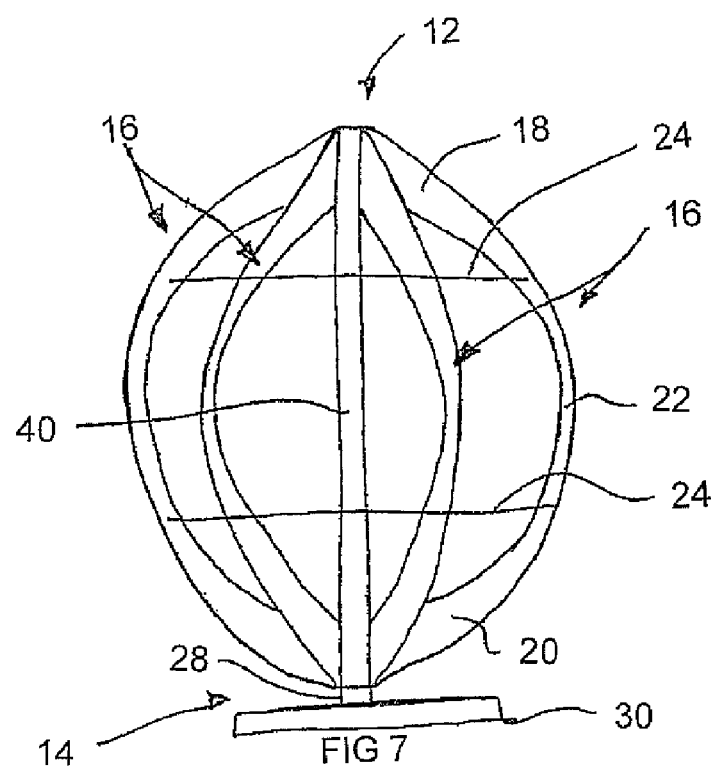
FIG. 7 is a side elevational view of a further embodiment of the turbine in which the blades have a varying cross sectional dimension.

Turning now to FIG. 7, a further embodiment of the turbine 10 is illustrated in which blades 16 are again provided with a similar configuration of a top segment 18, a bottom segment 20 and a middle segment joined therebetween with additional support being provided by support members 24 under tension therebetween as described above. A central column 40 of the turbine rotates with the turbine to drive an axial 28 of a generator 30 also as described in previous embodiments. The embodiment of FIG. 7 differs in that the cross sectional dimension of each blade is configured to be at its narrowest cross sectional dimension at a vertical center of the middle segment 22. The cross sectional dimension of the blades increases towards opposing ends so that the blades are thickest and have the greatest cross sectional dimension where the top segment 18 joins the top 12 of the turbine and where the bottom segment 20 joins the bottom 14 of the turbine. The varying cross sectional dimension of the blades also serve to optimize the performance of the blades and the shape thereof when subjected to bending forces during rotation of the turbine.

Figure 8A:
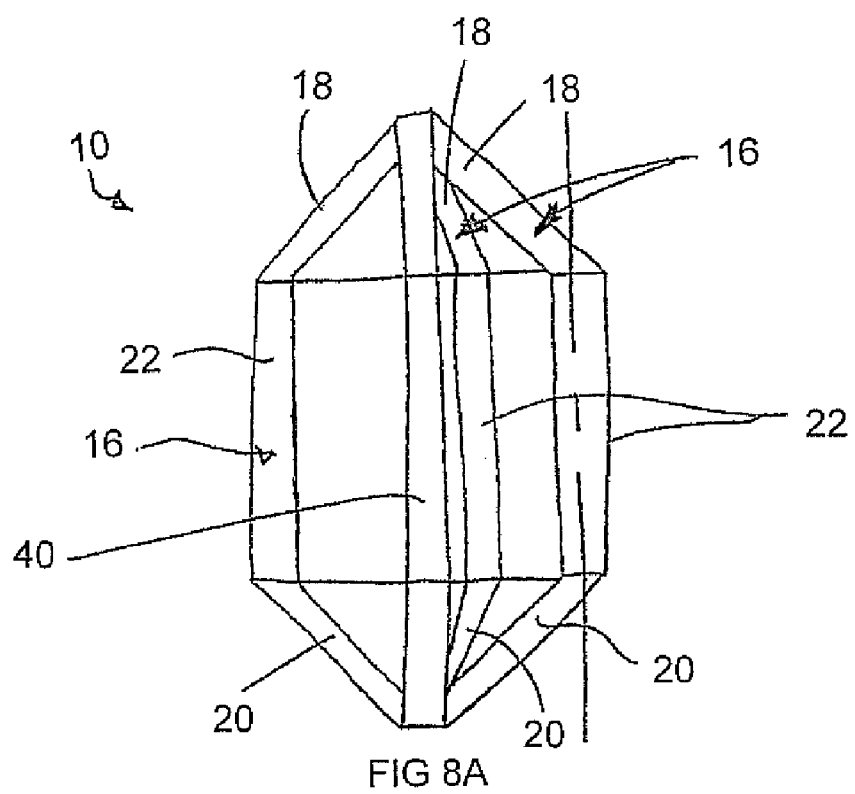
FIG. 8A is a side elevational view of a further embodiment of the turbine including a pivotal blade segment.
Figure 8B:
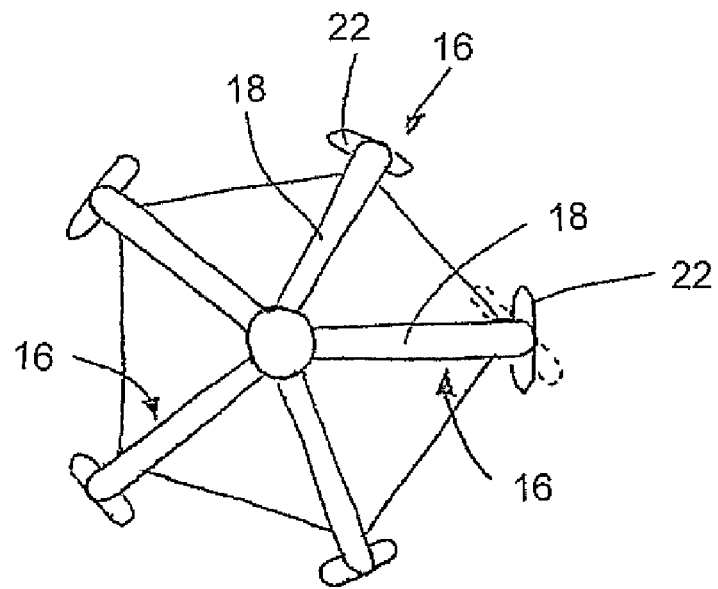
FIG. 8B is a top plan view of the turbine according to FIG. 8A.

Turning now to the embodiment of FIGS. 8A and 8B, the turbine is again provided with a similar construction of blades 16 including a top segment 18, a bottom segment 20 and a middle segment 22 which are supported by support members 24 in the form of cables under tension in a circumferentially path about the blades. In this instance however, each middle blade segment 22 comprises a pivotal blade segment which is pivotal about a respective longitudinal axis of the segment which extends in the elongate direction of the segment to be generally vertical and parallel to the axis of the rotation of the turbine. Each blade thus includes a middle segment 22 which is pivotal about its respective long axis relative to the other blade segments between a first position which produces a drag force to break the rotation of the turbine when rotating in a horizontal wind, and a second position in which the blade segment generates a torque about the vertical axis of rotation to urge the turbine to continue to rotate in the working direction of rotation. The angular orientation of the middle blade section of each blade can be adjusted independently of the other blades to optimize response of the turbine to particular wind conditions while preventing over speeding of the turbine about its axis of rotation.

Figure 9A:
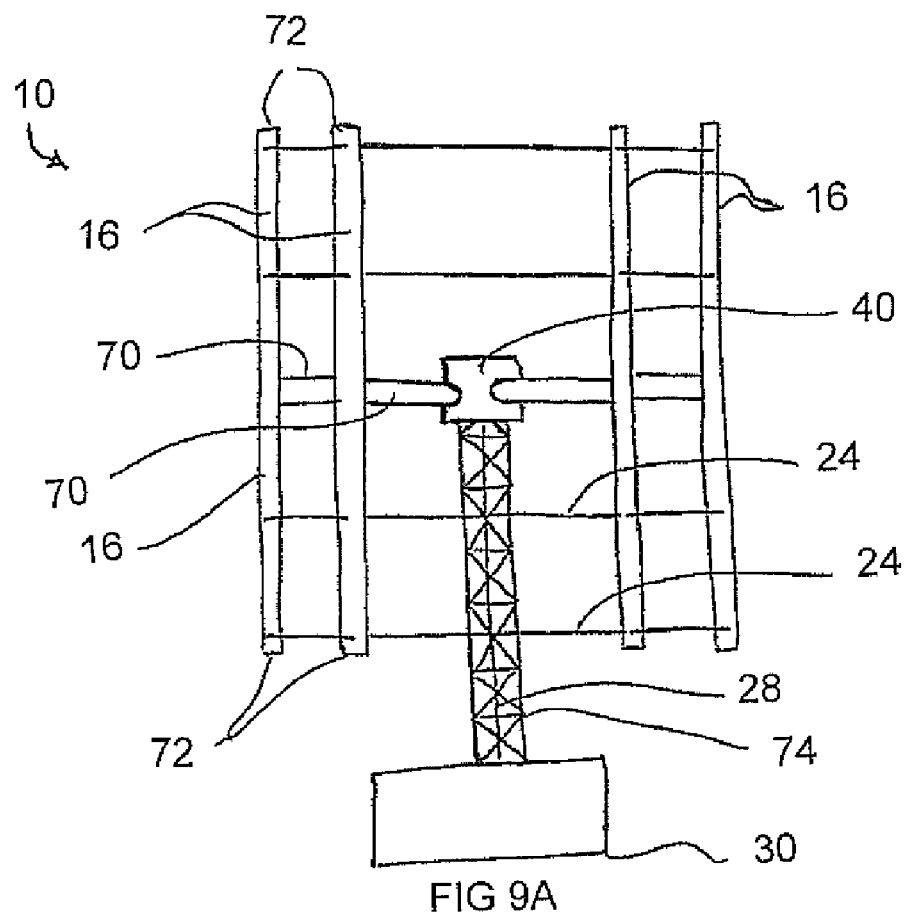
FIG. 9A is a side elevational view of another embodiment of the turbine.
Figure 9B:
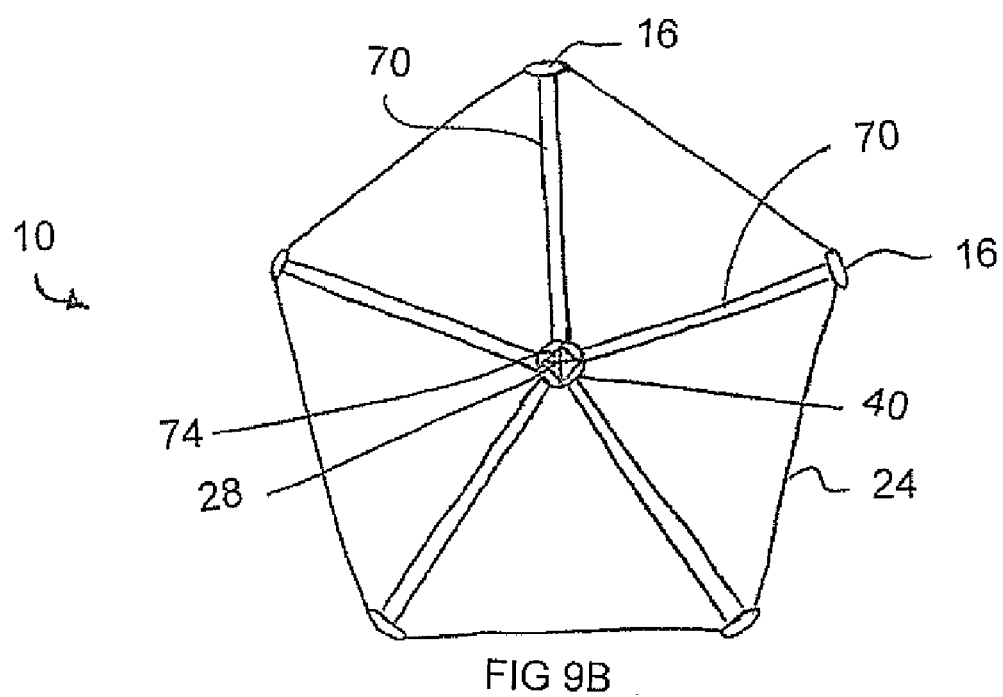
FIG. 9B is a top plan view of the turbine according to FIG. 9A.

Turning now to the embodiment of FIGS. 9A and 9B, the turbine 10 in this instance includes blades 16 which are each centrally supported by a respective spoke member 70 rigidly connected between the blades 16 and the central shaft 40 of the turbine. The spokes 70 have a cross sectional shape to minimize the drag thereof during rotation about the vertical axis of rotation of the turbine and are connected to the respective blades 16 at a vertical center thereof. Each blade thus extends upwardly and downwardly from the respective spoke member to opposing free ends 72 thereof spaced above and below the spoke respectively. The shaft in this instance comprises a collar rotatably supported about a central column 74 wherein the axle 28 communicates through the column 74 to the generator 30 so that rotation of the turbine drives the generator as in previous embodiments. When a set of three of more blades 16, and preferably five or more are provided about the vertical axis of the turbine, the support members 24 can again be provided at plural different elevations spanning horizontally between adjacent ones of the blades to form a circumferential or peripheral path about the turbine as described in previous embodiments. Applying tension to the support members 24 provides adequate support to the blades 16 to prevent the free ends 72 of the blades from bowing outwardly in use. By arranging the support members 24 in a circumferential path connected between adjacent ones of the blades, the cables will follow one another in a common circular path as the turbine is rotated without any additional spokes being required which cause considerably more drag so as to provide adequate structural support to the turbine while minimizing the drag thereof as described in the other embodiments of the turbine 10. To further simplify the construction and amount of material required, the central column 74 may comprise an open truss framework to support the turbine spaced up above the ground.

As described herein, all of the various embodiments generally comprise a vertical axis turbine in which a plurality of blades of generally upright or vertical orientation are provided circumferentially spaced about the vertical axis of rotation in which three or more blades, and preferably five or more are provided at evenly spaced positions about the axis. Each adjacent pair of the blades are interconnected by a horizontally extending support member coupled therebetween in which the support members together from a generally annular path about a circumference of the turbine so that a common annular support is defined by the support members 24 or by an annular frame member as defined in the following embodiments. The configuration of a circumferentially extending support connected between adjacent ones of the blades provide support to the blades while the construction thereof remains in a generally annular path as the turbine rotates to minimize the drag effect on the turbine which can be considerable in a lift type turbine which rotates at many times the speed of the prevailing winds.

Referring now more particularly to FIGS. 10 through 15, further embodiments of the lift type turbine according to the present invention are illustrated and generally indicated by reference numeral 110.

Although there are various embodiments of the turbine 110, the common features of the next few embodiments will now be described.

The turbine 110 includes a base annular frame member 112 which is circular about a central axis 114 about which the base annular frame member rotates. The base annular frame member 112 supports a plurality of blades 115 mounted at circumferentially spaced positions about the periphery thereof. The blades 115 are supported in a generally upright orientation to extend upwardly from the base annular frame member 112. Each blade has the general shape of an airfoil in cross section while being positioned relative to the annular frame member so as to be oriented to cause rotation of the annular frame member about the central axis 114 responsive to a wind blowing across the blades in a generally horizontal direction.

A plurality of auxiliary annular frame members 117 are also provided which are mounted concentrically with the base annular frame member 112 at axially spaced positions spaced thereabove. The auxiliary annular frame members 117 include an uppermost one which is connected adjacent the top ends of the blades 115 and one or more intermediate ones which are connected between all of the blades 115 at a midheight thereof spaced substantially evenly between the base annular frame member 112 and the uppermost one of the auxiliary annular frame member 117.

The annular frame members 112 and 117 along with the blades 115 are all coupled together so that the annular frame members support the blades and join them to form a structurally supported rotor of the turbine which rotates about the central upright axis 114 about which the annular frame members are concentrically mounted. The blades 115 therefore join the annular frame members by spanning thereacross at the outer periphery thereof.

A peripheral support system is provided in the form of a plurality of towers 118 which are spaced circumferentially about the base annular frame member 112. Each tower 118 includes a roller 120 or wheel supported at a top end thereof upon which the base annular frame member 112 is rotatably supported. The rollers 120 are supported at fixed positions relative to the ground about the periphery of the rotor while being freely rotatable so that the rotor is rotatable thereon about the upright axis 114. Complimentary rollers may additionally be provided for engaging the top and sides of the annular frame members in such a manner so as to retain the rotor in place engaged on top of the rollers 120 so that no additional central axle is required.

A plurality of tension members 122 are provided in the form of cables which span under tension diametrically across the annular frame members of the rotor. Each tension member is coupled at a top end to an upper one the annular frame members 117 to span across to a bottom end coupled on the base annular frame member 112 to provide additional structural support to the rotor.

A generator 124 is provided which converts rotation of the rotor, including the annular frame members and the blades supported thereon, into a different usable form of energy. The generator 124 is coupled directly to the base annular frame member 112 by connection through one of the rollers 120 of the peripheral support system to minimize the required gearing required at the generator input.

A braking system to prevent rotation of the rotor beyond an upper speed limit is provided in connection with the base annular frame member or any of the blades supported thereon. The brakes may take the form of drag elements which increase wind resistance to rotation of the rotor or may comprise a friction type brake applied to one of the annular frame members or to one or more rollers 120.

Figure 10:
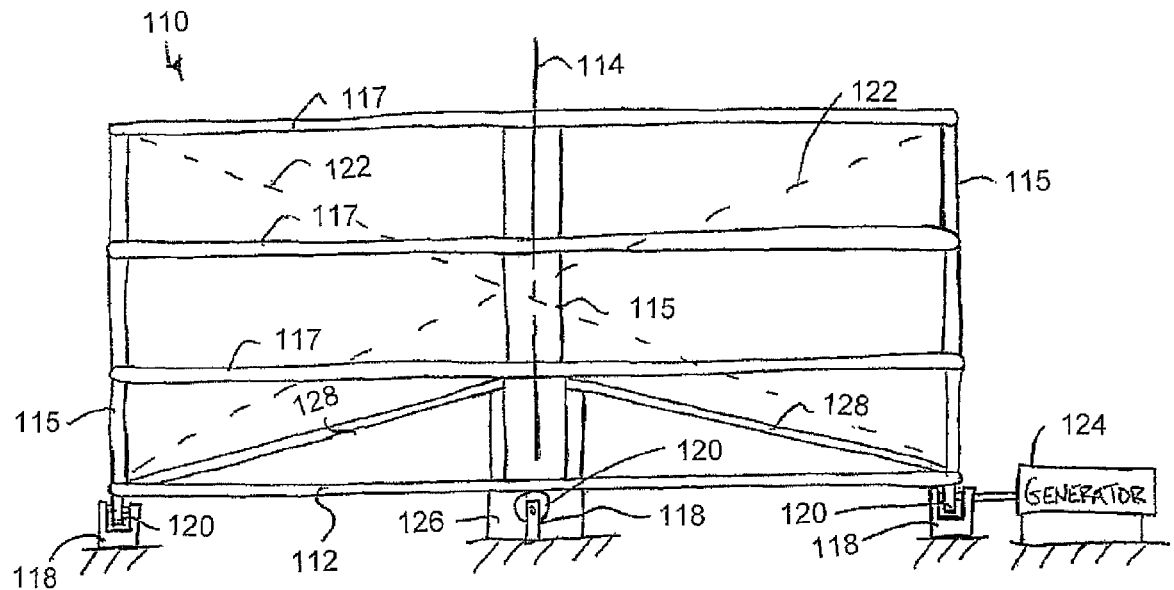
FIG. 10 is a side elevational view of another embodiment of the turbine.
Figure 11:
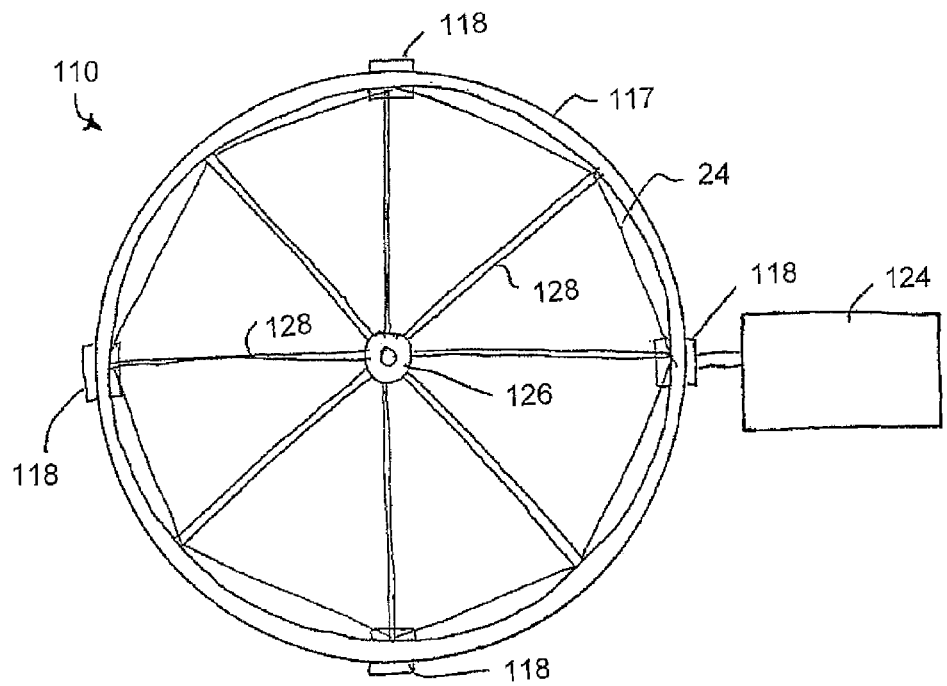
FIG. 11 is a top plan view of the turbine according to FIG. 10.

Turning now to the embodiment of FIGS. 10 and 11 in more detail, a central axle 126 is provided to which the annular frame members are connected by spokes 128 to provide additional structural support to the rotor. The spokes 128 could take on the shape of airfoils, cables, rods and the like and could be connected across the rotor to connect between diametrically opposed blades or locations on one or more annular members.

Figure 12:
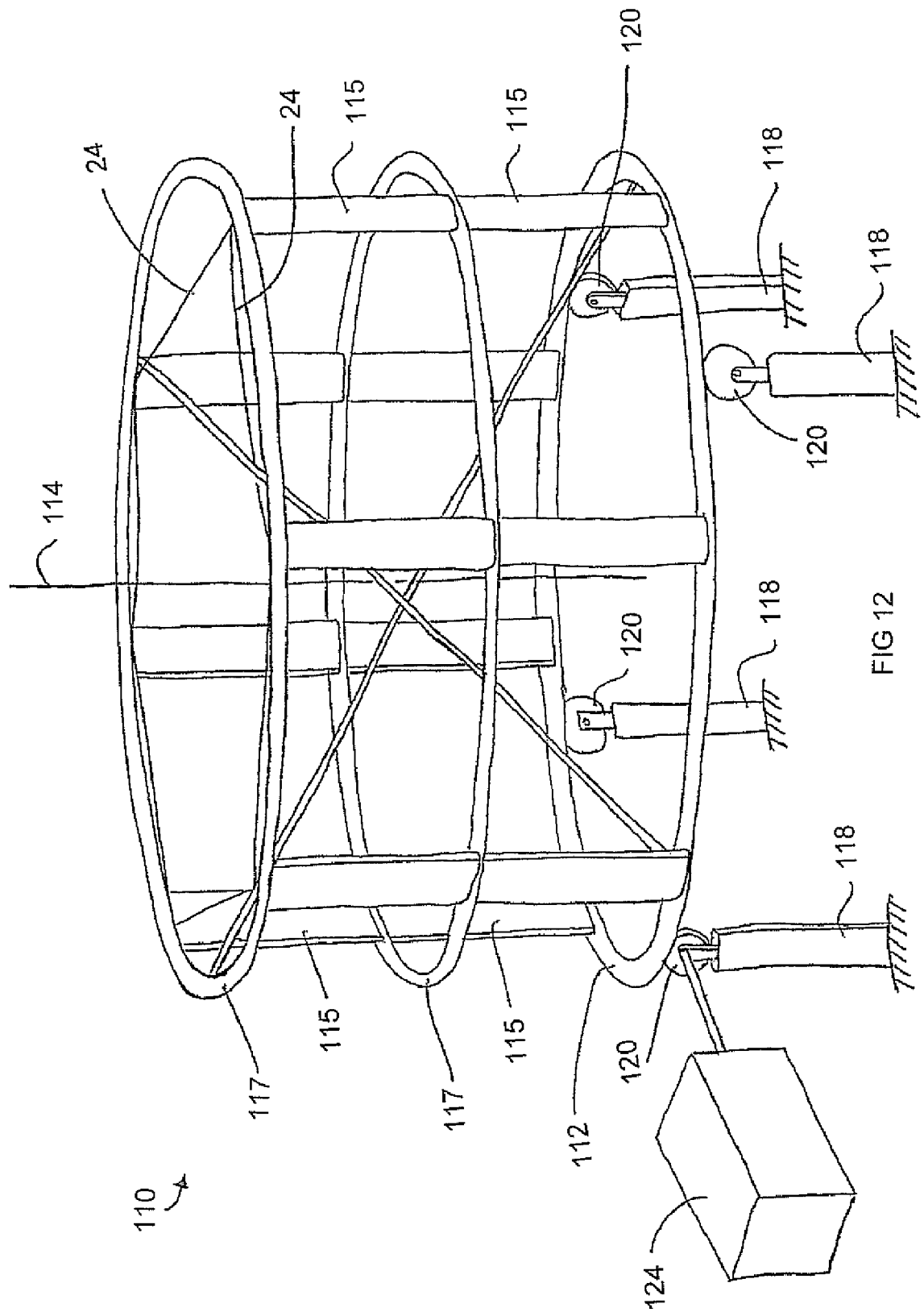
FIG. 12 is a perspective view of another embodiment of the turbine.
Figure 13:
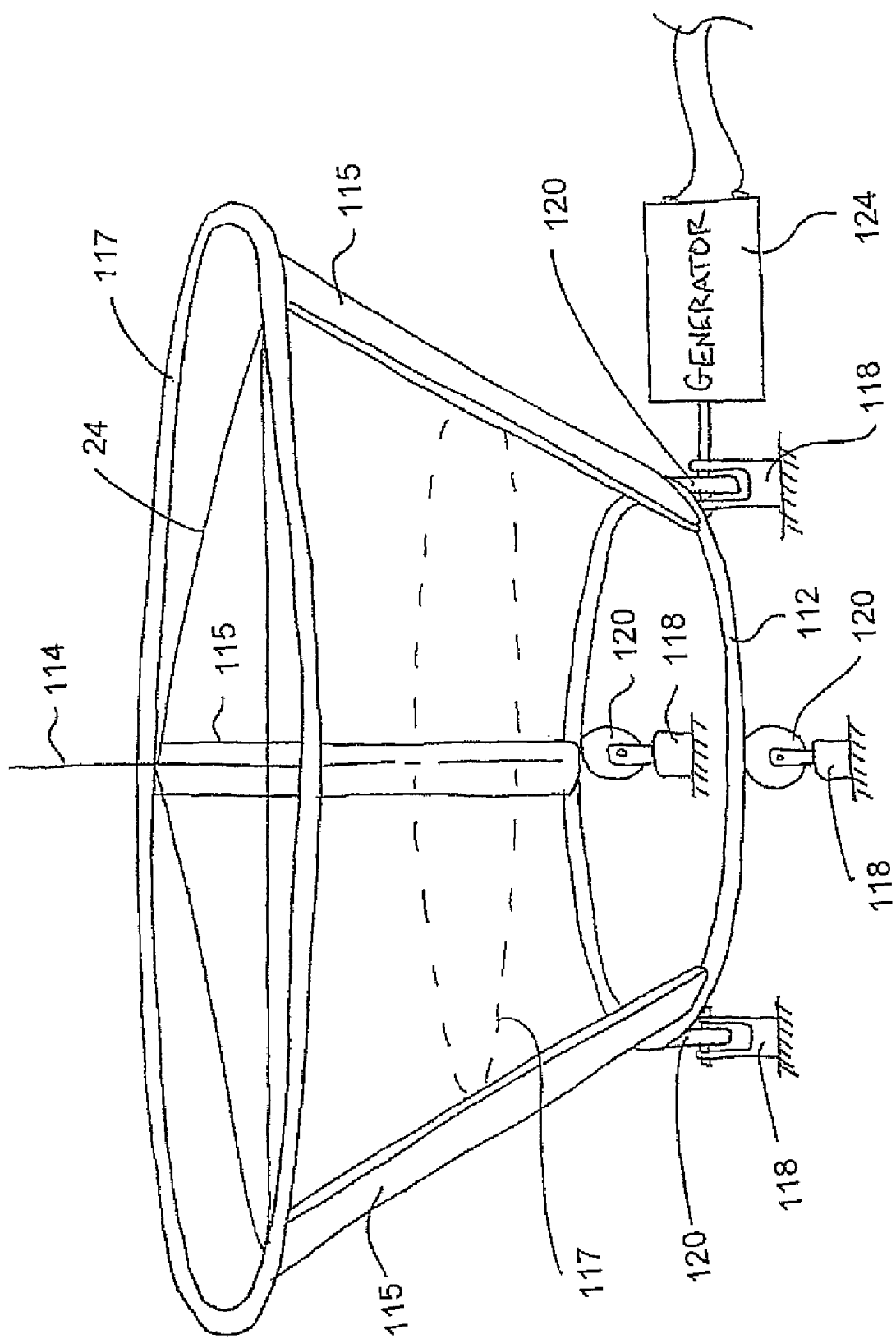
FIG. 13 is a perspective view of a further embodiment of the turbine.

With regard to the embodiments of FIGS. 10 through 12, in a preferred arrangement the blades are oriented in a vertical orientation, however as shown in the further embodiment of FIG. 13, the blades may also be supported at an upward and outward incline from the base annular frame member to an upper one of the annular frame members. Furthermore intermediate auxiliary annular frame members may be provided in greater numbers or may be eliminated depending on the size and structural support required to a particular turbine design.

Figure 14:
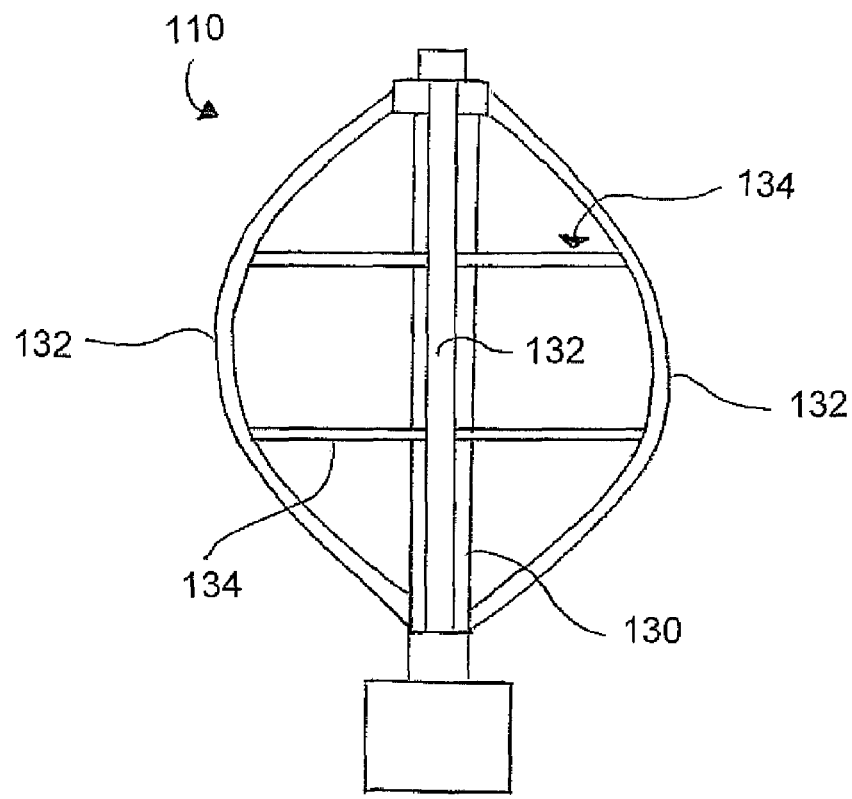
FIG. 14 is a side elevational view of yet a further embodiment of the turbine.
Figure 15:
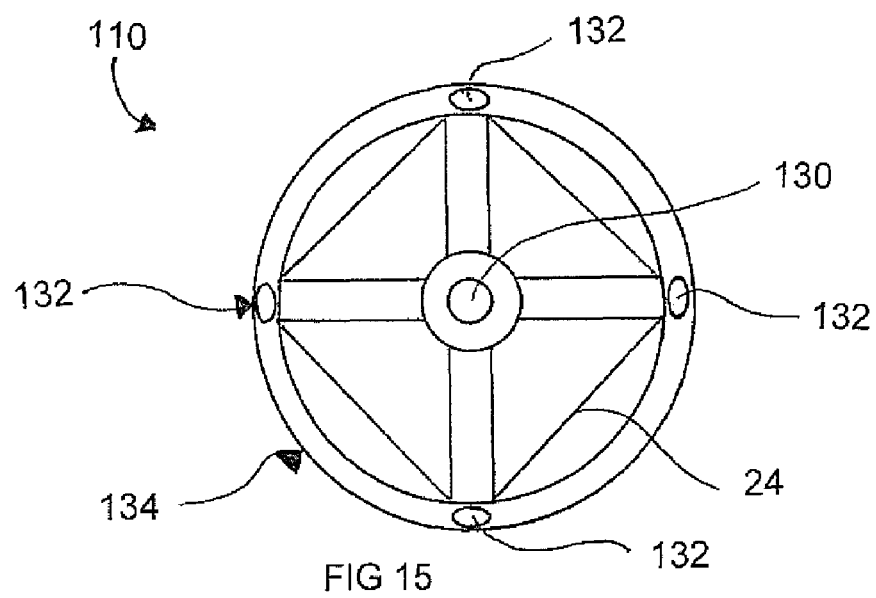
FIG. 15 is a top plan view of the turbine according to FIG. 14.

Turning now to the embodiment of FIGS. 14 and 15, the turbine comprises a Darrieus type turbine in which a central axle 130 is provided for supporting a plurality of blades 132 at circumferentially spaced positions thereabout for rotation about an upright axis of the axle 130. This configuration is similar to many conventional type Darrieus rotors. The turbine of the embodiment of FIG. 14 is distinguished in that annular frame members 134 are provided which are mounted concentrically about the axle 130 at axially spaced positions with a radius matching that of the blades 132 at the elevation where the annular frame members are mounted. Each annular frame member thus joins all of the blades which are accordingly mounted about the circumference thereof. The blades 132 accordingly span across the annular frame members which provide additional structural support to the blades for increasing the reliability and minimizing maintenance associated with the turbine. Additional support members 136 in the form of cables may also be provided similarly to the previous embodiments to span horizontally under tension between adjacent ones of the blades.

Figure 16:
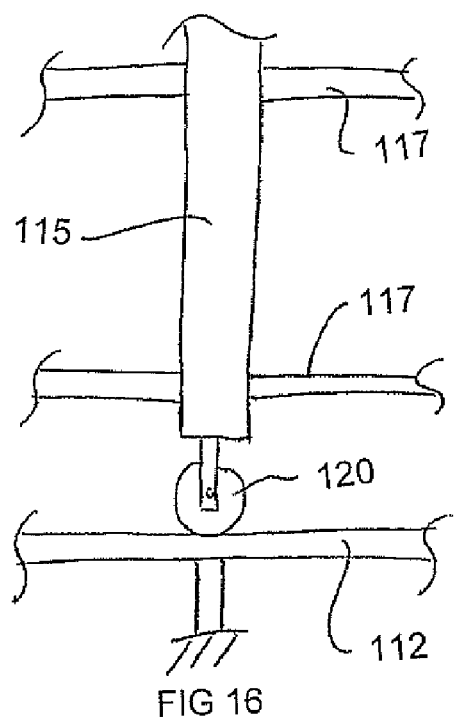
FIG. 16 is a schematic illustration of a portion of an alternative embodiment.

Turning now to FIG. 16 a variant of the embodiments of FIGS. 10 through 13 noted above is shown in which the base annular frame 112 is instead fixed relative to the ground on suitable supports with the rollers 120 being supported at the bottom ends of the blades 115 for rotation with the turbine about the vertical axis. Accordingly, the rollers 120 roll along the fixed frame 122 which functions as a track. Additional annular frame members 117 may be provided in a circumferential pattern about the blades as required for strength. In further arrangements the rollers maybe supported on an annular frame member that rotates with the blades while remaining rolling along the base member 112 which defines the annular track upon which the turbine is rotatably supported according to the embodiment of FIG. 16. In this instance the generator is driven through an auxiliary roller rolling along one of the annular frame members of the turbine or through a central shaft coupled to the turbine for rotation therewith.

Figure 17:
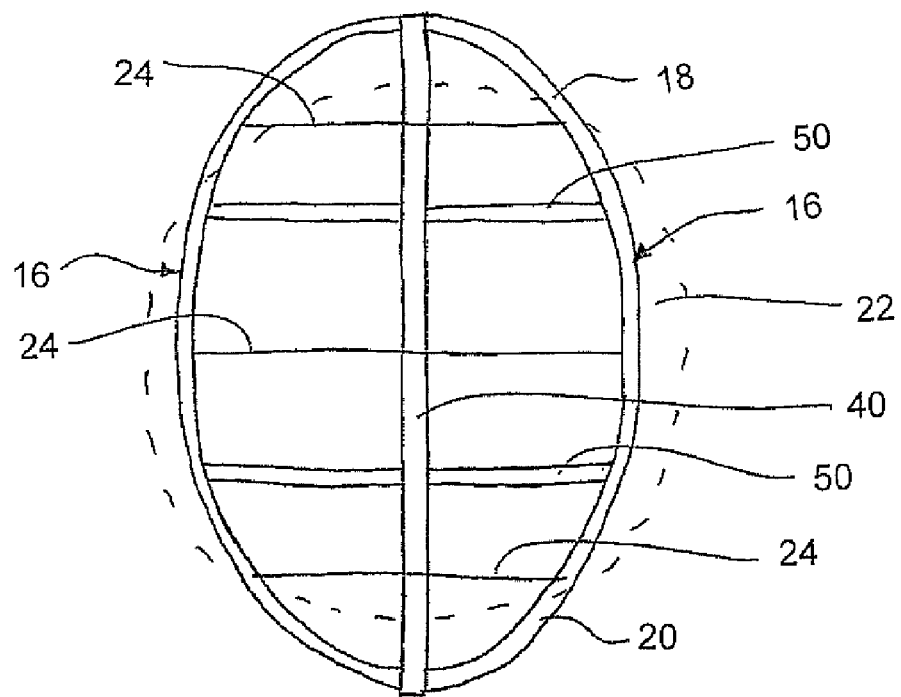
FIG. 17 is a side elevational view of further embodiment of the turbine.

Turning now to FIG. 17, a variant of the turbine according to FIG. 6 is illustrated in which the blades are instead formed of continuous generally semi-circular arcs or are formed in full circles to define two diametrically opposed blades when mounted on the shaft 40. The blades 16 of the embodiment of FIG. 17 thus each comprise a continuously formed arc of common and integrally formed material spanning between opposing ends of the blade which are anchored in fixed relation onto the shaft 40 at axially spaced positions at respective top and bottom ends thereof.

In FIG. 17 the original shape of the blades are shown in broken line prior to being flexed and shaped into a prestressed condition by the flexible support members 24 spanning under tension between adjacent ones of the blades in a generally circumferential path as in previous embodiments and by auxiliary supports 50 in the form of rigid struts spanning either between the central shaft 40 and respective ones of the blades in a radial direction or spanning between adjacent ones of the blades in a generally circumferential pattern similarly to the support members 24.

In a preferred arrangement one set of rigid supports 50 maybe provided at a prescribed spacing in the axial direction from each end of the turbine so as to define the upper segments 18 of the blades as the portion extending above the first set of supports 50, to define the middle segments 22 of the blades as spanning between the two different sets of support members and to define the lower segments 20 of the blades as extending between the lowermost set of the supports and the bottom end of the shaft. Each of the upper and lower segments of the blade 18 and 20 respectively extend radially outwardly from the shaft of the turbine at respective downward and upward inclines similarly to the previous embodiments.

The flexible support members 24 are arranged under tension at various intermediate locations to shape the blades so that the middle segments of the blades are generally flatter than upper and lower curved segments formed above and below each middle segment. The curved segments above and below each middle segment form transitions at the location of the supports 50 where there is a greater curve in the blade as the blade transitions into the straighter upper and lower segments defined relative to the supports 50.

In further embodiments any combination of supports 50 which are rigid and support members 24 comprising flexible cables under tension maybe used to shape continuously formed blades into any desired shape relative to the shaft 40 to which the blades are anchored at opposing ends. In preferred arrangements the blades are flexed and shaped into a pre-stressed condition such that a defined middle segment thereof is generally straighter and near vertical or parallel to the vertical axis as compared to remaining portions of the blade above and below the defined middle segments.

As described and illustrated herein, the proposed turbine design is a vertical axis turbine. The blades, which have a cross sectional shape similar to airfoils, are mounted vertically in some embodiments. They are attached to one or more generally annular or circular rings of cables or support members 24 under tension, or annular frame members, and may or may not rotate around a tower. The annular rings and blades may be attached to the pivot point of a central axle with arms or spokes. As shown in some embodiments, the annular frame members may be supported by rollers between the lowest ring and the surface. These rollers may be attached to the ground, the rings or to the blades. The support rollers may also follow a designated path similar to rail cars following a track on a railroad system, or cars on a roller coaster. If the rollers follow a track, a tower and arms may not be necessary.

The support members 24, as described above in the first few embodiments, can be applied to all of the designs of turbines 10 and 110 noted herein with the same benefits being realized of providing lightweight structural support with minimal drag when provided in a circumferential path due to the tracking of the cables with one another during rotation of the turbine.

According to the later embodiments, the modular turbine consists of sectional rings and blades. Each section of ring and each section of blade can be assembled at ground level and inserted below the lowest ring. Most blade and ring sections would be similar and therefore manufacturing costs would be decreased.

The diameter of the turbine is completely variable. However, a larger diameter will have less centrifugal force on the rings and blades. The blade speed is usually constant, and therefore independent of the diameter. The number of blades, the length of the blades, and the number of rings is also variable, but would be restricted by the stability of the rotor.

A large diameter rotor (rings) would support more rings or longer blades and, therefore, would take advantage of the higher wind speeds above the earth's surface. As the number of rings increase or the blade length increases, cables could be attached wherever necessary to help strengthen the rotor. These supports could be attached between blades, blades and rings, rings and rings, blades and tower, rings and tower or any combination needed for rotor strength and support. Also, more rollers or bigger rollers could be added for more support for the heavier structure.

Rollers can be attached to the surface for support. A generator could be connected to one or more spinning rollers for the extraction of electrical energy. The generator could also be mechanically connected to the rotor with a separate system. This system could use wheels, rollers, gears, pulleys, chains, belts or any combination to form a mechanical drive train that would convert the rotational speed of the turbine into electrical energy. This connection, if attached at the outer circumference would not likely require an increase in generator speed and therefore, a planetary or gear increaser would not be necessary.

The rollers or wheels could also have brakes attached to them and could be used to stop the turbine when necessary. Wind turbines must never over-speed. If over-speeding occurs, the generator may be overheated and burn out, or the turbine itself may destruct. Over-speeding may be prevented by adding drag devices or air brakes such as flaps or airfoils to the blades or rings. These devices would only provide excessive aerodynamic drag when the turbine is overspeeding. These devices could be controlled by centrifugal forces or by a microprocessor.

The turbine according to the present invention can be manufactured and assembled for a fraction of the cost of existing turbines. Also, there are fewer size restrictions on a turbine as described herein. Presently, horizontal axis and vertical axis wind turbines are restricted in size due to strength of materials and economics. The present turbine designs could have a diameter measured in 1000's of meters with heights exceeding present day turbine heights. Massive steel towers may not be required. Furthermore, higher power efficiencies can be obtained due to larger diameters and larger blades (resulting in higher Reynolds Number). In the turbines described herein, the only moving parts are close to the ground (with the exception of the air brakes which are only used in emergency situations for ease of maintenance. Other advantages include the elimination of gear increases and the ease of assembly of the turbine.

In further embodiments, the number of rings or annular frame members can be varied. The number of rollers can also be 1 or more. The turbine may not need a central pivot point or central tower support if a track (similar to a railway track) is being used. The number of blades and the size of each blade are completely variable. The number of blades between each ring may also vary. Rollers may be needed under, above or on the sides of the rings to keep the rotor in place. The rollers can be attached to the surface, the rings or the blades. The blades do not have to be vertical. The path outlined by a complete revolution may have a larger or smaller diameter as the blade extends above the surface. The rings may have various diameters.

In general, in the embodiments of FIGS. 10 through 13, circular rings are used to join the blades together to make a solid rotor in a vertical axis lift type turbine. Rollers between the bottom ring and the surface are used to stabilize the rotor. The rollers or the rings can be used to extract power. The rollers, which already have a high angular velocity, can be connected to the generator by use of a drive shaft. The rings, which have a high tangential velocity, can be connected to a generator by use of rollers, gears, pulleys, chains, belts, etc.

In further embodiments, any number of tension members or spokes may be provided as required for structural integrity of the various illustrated embodiments by spanning between blades, annular members, a central axle or any combination thereof. The embodiment of FIG. 12 for example may include a plurality of spokes or tension members spanning diametrically across the rotor between opposed blades or opposed portions of one or more annular frame members. Location of the annular frame members may also be varied so that the blades extend either above or below a respective uppermost or lowermost one of the annular frame members.

Figure 18:
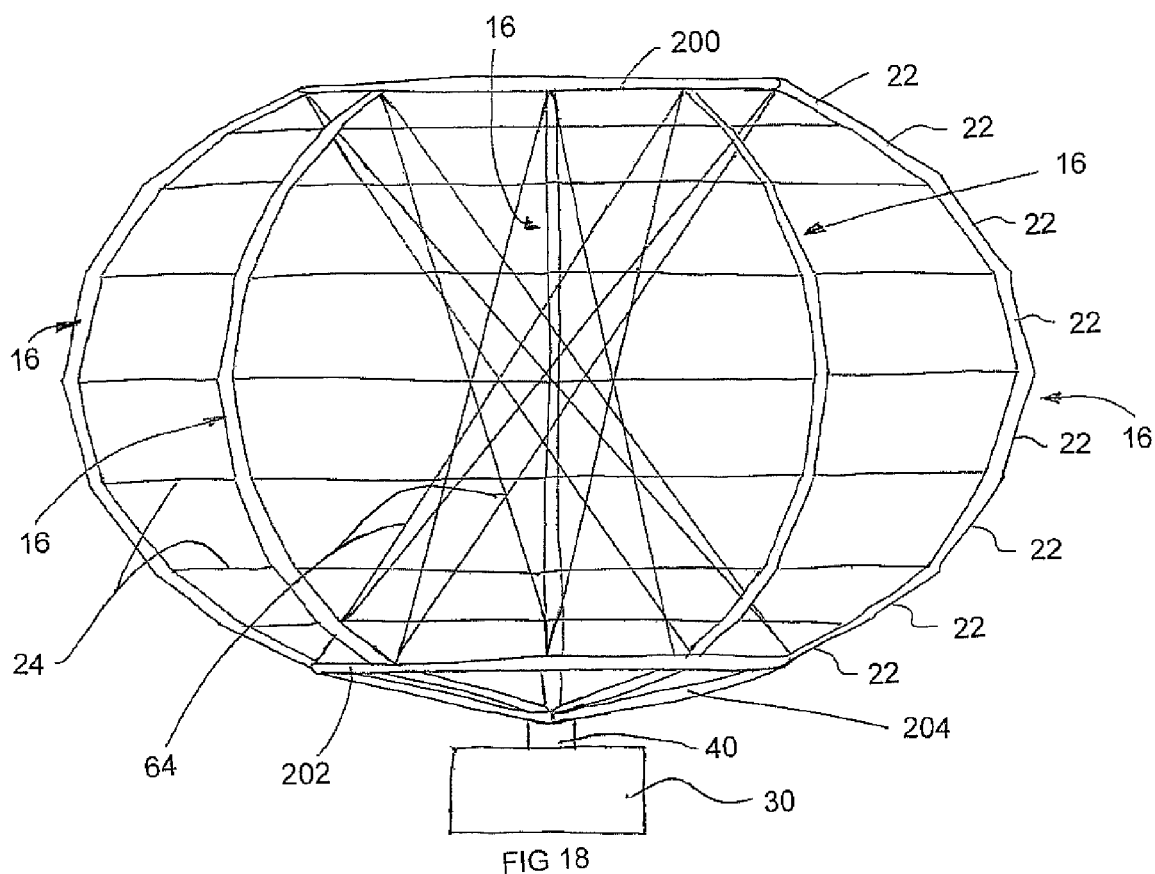
FIG. 18 is a side elevational view of a further embodiment of the turbine.

Turning now to FIG. 18 a further embodiment of the turbine 10 is illustrated in which a set of five blades 16 are mounted circumferentially about the vertical axis of rotation of the turbine similar to previous embodiments. In the embodiment of FIG. 18, there is provided an upper annular member 200 and a lower annular member 202 between which the blades 16 are mounted. Each of the upper and lower annular members is generally annular in shape so as to extend circumferentially about the vertical axis of rotation concentrically therewith in respective horizontal planes oriented perpendicularly to the vertical axis. Each blade 16 is mounted at a top end on the upper annular member 200 and at a bottom end on the lower annular member 202 so as to extend between the upper and lower annular members at circumferentially spaced positions thereabout. Each of the upper and lower annular members can be joined to a central shaft 40 by suitable spoke members 204 which extend generally radially between the shaft 40 and the annular member similar to the auxiliary support members 25 shown in FIG. 1A.

The blades 16 in the embodiment of FIG. 18 comprise only a plurality of intermediate segments 22 which are joined end to end with one another so as to form a continuous and outwardly curved blade 16 which is spaced outwardly at the vertical center thereof relative to the periphery of the upper and lower annular members. In FIG. 18, eight segments 22 are shown on each blade however more or less segments may be provided as desired. A greater number of segments better approximates a Darrieus type rotor however a fewer number of segments is easier to construct. Each of the segments is typically a rigid section of the blade which extends substantially straight between the opposed ends thereof. The adjacent sections are joined at an obtuse interior angle relative to one another to form the gradually outwardly curved profile of the overall blade.

Similarly to the previous embodiments, a plurality of circumferentially extending supports 24 are provided in respective horizontal planes to be connected between adjacent ones of the blades in a generally circular pattern about the periphery of the turbine. Each circumferential support 24 is located at a respective horizontal plane oriented perpendicularly to the vertical axis of rotation. A circumferential support 24 is provided at a junction between each adjacent pair of blade segments of the blades 16 of the turbine. The circumferential supports 24 typically comprise flexible cables spanning under tension between adjacent ones of the blades to provide adequate support to the blades.

In addition to the circumferential supports 24, a plurality of transverse supports 64 may also be provided in the form of cables extending under tension similar to the embodiment of FIG. 5A. In the embodiment of FIG. 18, a top end of each blade 16 is connected to the bottom end of two other blades which are generally diametrically opposed therewith relative to the vertical axis of rotation by one of the transverse supports 64. When providing a plurality of transverse supports 64 interconnected between opposed ones of the blades at opposed top and bottom ends thereof, a central shaft may not be required which extends between the top and bottom ends of the turbine and accordingly only a small shaft 40 is provided between the spokes 204 of the lower annular member and the generator 30. In addition to no central shaft being provided between the top and bottom ends of the turbine, no additional anchors or guy wires are required to be connected between the top end of the turbine and the ground due to the structural support provided by the transverse supports and the upper and lower mounts. Similar to previous embodiments, the generator 30 is driven to rotate by rotation of the turbine and the shaft 40 rotating with the turbine which connects to the generator.

The spokes and tension members in the various embodiments of the present invention may comprise rods, flat shapes or airfoil shaped tension devices if the circular shape of a cable provides too much aerodynamic drag to be practical.

In yet further embodiments, the rollers may be attached to the blades for movement about the central axis therewith. In this arrangement, the generator could be built inside the blades and mechanically connected to the rollers.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A lift-type turbine comprising:
   at least three blades supported for rotation about a vertical axis of rotation of the turbine;
   the blades being supported relative to one another at circumferentially spaced positions about the vertical axis of rotation;
   each blade comprising a member having an airfoil shape in cross section such that the blades generate a torque in a direction of rotation of the turbine about the vertical axis responsive to a generally horizontal wind across the blades as the blades are rotated in the direction of rotation of the turbine; and
   a support connected between adjacent ones of the blades to extend generally circumferentially about the turbine;
   wherein the blades are supported substantially wholly by the generally circumferentially extending support connected between the adjacent blades.

2. The turbine according to claim 1 wherein the support comprises a plurality of flexible members supported under tension between adjacent ones of the blades.

3. The turbine according to claim 1 wherein the support comprises a plurality of flexible members supported between adjacent ones of the blades such that the flexible members are arranged to curve outwardly and form a generally circular path when the blades are rotated about the vertical axis of rotation in operation.

4. The turbine according to claim 1 wherein the support comprises support members connected between adjacent blades in at least one common plane lying perpendicularly to the vertical axis of rotation.

5. The turbine according to claim 1 wherein the blades are arranged to be supported in a pre-stressed condition by the support prior to rotation of the turbine.

6. The turbine according to claim 1 wherein the blades are arranged to be supported in a flexed position by the support prior to rotation of the turbine.

7. The turbine according to claim 1 wherein each blade comprises a plurality of blade segments which are connected end to end with one another and the support comprises a plurality of annular support members, each annular support member extending circumferentially about the vertical axis in a respective plane lying perpendicular to the vertical axis and being connected to the blades adjacent a junction between adjacent ones of the blade segments.

8. The turbine according to claim 1 wherein there is provided at least five blades evenly spaced circumferentially about the axis.

9. The turbine according to claim 1 wherein each blade comprises a plurality of blade segments including:
   an upper blade segment extending radially outwardly at a downward incline from the top end of the turbine at the vertical axis;
   a lower blade segment extending radially outwardly at an upward incline from the bottom end of the turbine at the vertical axis; and
   at least one middle blade segment extending substantially parallel to the vertical axis between the upper blade segment and the lower blade segment at a location spaced radially outwardly from the vertical axis.

10. The turbine according to claim 9 wherein each blade segment is substantially straight in a longitudinal direction of the blade segment between opposing ends of the blade segment.

11. The turbine according to claim 9 wherein said at least one middle blade segment extends substantially parallel to the vertical axis.

12. The turbine according to claim 9 wherein said at least one middle blade segment spans at least half a height of the respective blade.

13. The turbine according to claim 1 in combination with an auxiliary turbine of similar configuration wherein:
   the auxiliary turbine is stacked above the other turbine and arranged for rotation about a common vertical axis with the other turbine;
   each blade of the other turbine comprises a plurality of blade segments including an upper blade segment extending radially outwardly at a downward incline from the top end of the turbine at the vertical axis and a lower blade segment extending generally radially outwardly from the bottom end of the turbine at the vertical axis;
   each blade of the auxiliary turbine comprises a plurality of blade segments including an upper blade segment extending generally radially outwardly from the top end of the turbine at the vertical axis and a lower blade segment extending generally radially outwardly at a downward incline from the bottom end of the turbine at the vertical axis such that the upper blade segments of the other turbine and the lower blade segments of the auxiliary blade segments are substantially parallel; and
   there is provided an anchor member anchored at the common axis between the auxiliary turbine and the other turbine at one end and anchored to the ground at an opposing end.

14. The turbine according to claim 1 wherein each blade comprises a plurality of blade segments connected end to end with one another and wherein at least one blade segment of each blade comprises a pivotal blade segment which is pivotal about a respective longitudinal axis relative to the other blade segments of the blade.

15. The turbine according to claim 14 wherein the blade segments of each blade comprise an upper blade segment extending radially outwardly at a downward incline from a top end of the turbine at the vertical axis and a lower blade segment extending radially outwardly at an upward incline from a bottom end of the turbine at the vertical axis, each pivotal blade section being joined between a respective one of the upper blade segments and a respective one of the lower blade segments.

16. The turbine according to claim 1 wherein there is provided a common shaft supported along the axis of rotation and each blade comprises a continuous arc shaped member supported at opposite ends at spaced apart positions along the shaft, the support comprising a plurality of support members spanning under tension between adjacent ones of the blades in a plurality of generally circumferential paths about the turbine at spaced positions in a direction of the vertical axis, the support members being arranged to support the blades in a flexed and pre-stressed condition.

17. The turbine according to claim 1 wherein each blade comprises a plurality of blade segments connected end to end with one another, each blade segment being substantially straight and being joined with adjacent blade segments by a smooth curved transition.

18. The turbine according to claim 1 wherein there is provided an upper annular mount and a lower annular mount supported on the shaft, each annular mount being annular in shape and extending circumferentially about the vertical axis in a plane oriented perpendicularly to the vertical axis, the blades being mounted between the upper annular mount and the lower annular mount at a top end and a bottom end respectively at circumferentially spaced apart locations about the vertical axis.

19. The turbine according to claim 1 wherein the support consists only of a plurality of flexible members supported under tension between adjacent ones of the blades.

20. A lift-type turbine comprising:

at least three blades supported for rotation about a vertical axis of rotation of the turbine;

the blades being supported relative to one another at circumferentially spaced positions about the vertical axis of rotation;

each blade comprising a member having an airfoil shape in cross section such that the blades generate a torque in a direction of rotation of the turbine about the vertical axis responsive to a generally horizontal wind across the blades as the blades are rotated in the direction of rotation of the turbine; and a support connected between adjacent ones of the blades to extend generally circumferentially about the turbine:

wherein a top end of each one of the blades is connected with a bottom one of at least one diametrically opposed one of the blades by an auxiliary support member spanning under tension therebetween.

* * * * *